United States Patent
Sato et al.

(10) Patent No.: US 8,929,881 B2
(45) Date of Patent: Jan. 6, 2015

(54) RADIO COMMUNICATION SYSTEM, SMALL CELL BASE STATION, RADIO TERMINAL, TRANSMISSION POWER CONTROL METHOD, AND ALLOCATION CONTROL METHOD

(75) Inventors: Hirotaka Sato, Kanagawa (JP); Kazutaka Nakamura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 389 days.

(21) Appl. No.: 13/390,063

(22) PCT Filed: Mar. 5, 2010

(86) PCT No.: PCT/JP2010/053686
§ 371 (c)(1),
(2), (4) Date: Feb. 10, 2012

(87) PCT Pub. No.: WO2011/018906
PCT Pub. Date: Feb. 17, 2011

(65) Prior Publication Data
US 2012/0142334 A1 Jun. 7, 2012

(30) Foreign Application Priority Data
Aug. 11, 2009 (JP) ................................ 2009-186914

(51) Int. Cl.
*H04W 4/00* (2009.01)
*H04W 52/24* (2009.01)
*H04W 16/32* (2009.01)
*H04W 84/04* (2009.01)

(52) U.S. Cl.
CPC ............ *H04W 52/244* (2013.01); *H04W 16/32* (2013.01); *H04W 84/045* (2013.01)
USPC ..................................................... 455/422.1

(58) Field of Classification Search
CPC ............ H04W 52/244; H04W 52/143; H04W 84/045; H04W 52/146; H04W 52/245; H04W 52/243; H04W 52/242; H04W 52/325; H04W 16/16; H04W 72/085; H04W 72/082; H04W 52/241; H04W 28/048; H04W 52/346
USPC .......................... 455/452.1, 522, 67.11, 422.1
See application file for complete search history.

(56) References Cited

U.S. PATENT DOCUMENTS

2009/0286545 A1* 11/2009 Yavuz et al. ................ 455/452.1
2014/0011511 A1* 1/2014 Budic et al. ................ 455/452.1

FOREIGN PATENT DOCUMENTS

| JP | 2004-186923 A | 7/2004 |
| WO | 2008/076219 A2 | 6/2008 |
| WO | 2008/108228 A1 | 9/2008 |

OTHER PUBLICATIONS

An Office Action; "Notice of Reasons for Rejection," issued by the Japanese Patent Office on Aug. 27, 2013, which corresponds to Japanese Patent Application No. 2011-526694 and is related to U.S. Appl. No. 13/390,063; with Statement of Relevance.

(Continued)

*Primary Examiner* — Kwasi Karikari
(74) *Attorney, Agent, or Firm* — Studebaker & Brackett PC

(57) ABSTRACT

A radio communication system wherein a femto cell base station (100a) is located in a macro cell (MC1) and a radio terminal (200a) is connected to the femto cell base station (100a) and wherein the femto cell base station (100a) or radio terminal (200a) controls, based on a propagation loss between the radio terminal (200a) and a macro cell base station (300a) existing in the neighborhood of the radio terminal (200a), the transmission power of a radio signal to be transmitted from the radio terminal (200a) to the femto cell base station (100a).

8 Claims, 14 Drawing Sheets

(56) References Cited

OTHER PUBLICATIONS

3GPP TSG-RAN WG1 #57; R1-092048; "LTE UL performance for ITU scenarios"; May 2009.
Sato et al.; "Investigation on Uplink Transmission Power Control Methods in Evolved UTRA with Home Base Stations"; IEICE Technical Report RCS2009-86; vol. 109, No. 164, pp. 49-54; Jul. 27, 2009.
Jo et al.; "A Self-organized Uplink Power Control for Cross-Tier Interference Management in Femtocell Networks"; Military Communications Conference; MILCOM 2008. IEEE, pp. 1-6; Nov. 19, 2008.
International Search Report; PCT/JP2010/053686; Jun. 8, 2010.

* cited by examiner

——— : PATTERN 1
- - - - : PATTERN 2
—·—·— : PATTERN 3

RADIO COMMUNICATION SYSTEM, SMALL CELL BASE STATION, RADIO TERMINAL, TRANSMISSION POWER CONTROL METHOD, AND ALLOCATION CONTROL METHOD

TECHNICAL FIELD

The present invention relates to a radio communication system, a small cell base station, a radio terminal, and a transmission power control method, which control the transmission power of a radio signal transmitted from a radio terminal.

Furthermore, the present invention relates to a small cell base station and an allocation control method, which control the allocation of a radio resource to a radio terminal.

BACKGROUND ART

As the next-generation radio communication system for performing a higher speed communication with a higher capacity, as compared with the 3rd-generation and 3.5th-generation radio communication systems operated at present, LTE has been standardized in 3GPP which is the standardization body of a radio communication system. The technical specifications of the LTE have been specified as 3GPP Release 8, and Release 9, which is an upgrade version of Release 8, and LTE Advanced, which is a sophisticated version of the LTE, have been currently considered.

As an uplink transmission power control method in the LTE, for example, the following technology has been proposed (see Non-Patent Document 1). In the technology disclosed in the Non-Patent Document 1, based on the state where overload indicator (OI), which represents interference information indicating the level of interference to a base station in an uplink, is notified between base stations, the transmission power of a radio terminal connected to an own base station is controlled according to the OI.

Furthermore, in the LTE Release 9, a small cell (referred to as a "femto cell"), which is a communication area having a radius of about several meters, is formed, and detailed functions and conditions of a small cell base station (referred to as a "Home eNodeB"), which is a small base station installable in an indoor space, have been standardized. The small cell base station can disperse traffic of a large cell base station (referred to as a "Macro eNodeB"), which forms a large cell (referred to as a "macro cell") that is a communication area having a radius of about several hundreds of meters, and can cover a dead zone in the large cell.

PRIOR ART DOCUMENT

Non-Patent Document

NON-PATENT DOCUMENT 1: 3GPP, R1-092048, "LTE UL performance for ITU scenarios", May 2009

SUMMARY OF THE INVENTION

Meanwhile, an installation place of the large cell base station is determined by a communication provider in consideration of inter-cell interference. However, since the small cell base station can be installed at an arbitrary place by a user, the small cell base station may be installed in the large cell formed by the large cell base station.

In such a case, when a radio terminal connected to the small cell base station and a radio terminal connected to the large cell base station use the same frequency band in order to perform communication, the large cell base station is affected by interference due to a radio signal transmitted to the small cell base station from the radio terminal connected to the small cell base station. Specifically, when propagation loss between the large cell base station and the radio terminal connected to the small cell base station is small, the large cell base station is affected by large interference from the radio terminal connected to the small cell base station, resulting in a problem that the throughput of the radio terminal connected to the large cell base station is lowered.

Therefore, the present invention has been achieved in view of the above-described problems, and an object thereof is to provide a radio communication system, a small cell base station, a radio terminal, a transmission power control method, and an allocation control method, by which it is possible to reduce interference to a large cell base station from a radio terminal connected to a small cell base station.

In order to solve the above problem, the present invention has following features. First of all, a first feature of the present invention is summarized as a radio communication system (e.g. a radio communication system 1) in which a small cell base station (e.g. a femto cell base station 200a) forming a small cell smaller than a large cell formed by a large cell base station (e.g. a macro cell base station 300a) is installed in the large cell, and a radio terminal (e.g. a radio terminal 200a) is connected to the small cell base station, wherein the small cell base station or the radio terminal comprises: a transmission power control unit (e.g. a transmission power control unit 125 or 225) configured to control the transmission power (e.g. transmission power P) of a radio signal transmitted from the radio terminal to the small cell base station, based on large cell-side propagation loss (e.g. $PL_1$ or $PL_{ave}$) indicating propagation loss between the radio terminal and the radio terminal's neighboring large cell base stations (e.g. macro cell base stations 300a and 300b). In addition, the "propagation loss" includes distance attenuation, shadowing loss, and feature pass loss.

According to the first feature of the present invention, the transmission power of a radio terminal is controlled in consideration of propagation loss between a large cell base station and a radio terminal connected to a small cell base station. For example, when large cell-side propagation loss is small, it is preferable to reduce the transmission power of a radio terminal. In this way, in an uplink, it is possible to reduce interference to a large cell base station from a radio terminal connected to a small cell base station. Meanwhile, when large cell-side propagation loss is large, it is preferable to increase the transmission power of a radio terminal. In this way, in the uplink, it is possible to improve the transmission quality of a radio terminal connected to a small cell base station.

In the first feature of the present invention, the large cell-side propagation loss may be propagation loss (e.g. $PL_1$) between the radio terminal and a large cell base station having smallest propagation loss with the radio terminal among the neighboring large cell base stations.

In the first feature of the present invention, the large cell-side propagation loss may be an average (e.g. $PL_{ave}$) of propagation loss between the radio terminal and each of the neighboring large cell base stations.

In the first feature of the present invention, the large cell-side propagation loss is an average of propagation loss between the radio terminal and the neighboring large cell base stations, and propagation loss between the radio terminal and a small cell base station (e.g. femto cell base station 100b), other than the small cell base station connected to the radio terminal, among the radio terminal's neighboring small cell base stations.

In the first feature of the present invention, the transmission power control unit may control the transmission power, based on small cell-side propagation loss (e.g. $PL_O$) indicating propagation loss between the radio terminal and the small cell base station connected to the radio terminal, in addition to the large cell-side propagation loss.

In the first feature of the present invention, the transmission power control unit may comprise: a reference value setting unit (e.g. reference value setting unit 122 or 222) configured to set a transmission power reference value, which serves as a reference of the transmission power, by using the small cell-side propagation loss; an adjustment value setting unit (e.g. adjustment value setting unit 123 or 223) configured to set a transmission power adjustment value for adjusting the transmission power by using the large cell-side propagation loss; and a transmission power determination unit (e.g. transmission power determination unit 124 or 224) configured to determine the transmission power by using the transmission power reference value and the transmission power adjustment value, wherein the adjustment value setting unit sets the transmission power adjustment value such that the transmission power is reduced as the large cell-side propagation loss is small, and the transmission power is increased as the large cell-side propagation loss is large.

In the first feature of the present invention, when interference information (e.g. OI) indicating a level of interference caused by the radio terminal is received in the small cell base station from the neighboring large cell base stations and/or neighboring small cell base stations through communication between base stations, the adjustment value setting unit may select one piece of conversion information from a plurality of pieces of conversion information (e.g. adjustment function $P_{offset}(x)$) for converting the large cell-side propagation loss into the transmission power adjustment value, based on the interference information, and set the transmission power adjustment value using the selected conversion information and the large cell-side propagation loss.

In the first feature of the present invention, the transmission power control unit may comprise: a reference value setting unit (e.g. reference value setting unit 122 or 222) configured to set a transmission power reference value, which serves as a reference of the transmission power, by using the small cell-side propagation loss; an adjustment value setting unit (e.g. adjustment value setting unit 123 or 223) configured to set a transmission power adjustment value for adjusting the transmission power by using the large cell-side propagation loss and the small cell-side propagation loss; and a transmission power determination unit (e.g. transmission power determination unit 124 or 224) configured to determine the transmission power by using the transmission power reference value and the transmission power adjustment value, wherein the adjustment value setting unit calculates a result obtained by subtracting the small cell-side propagation loss from the large cell-side propagation loss, as propagation loss difference, sets the transmission power adjustment value such that the transmission power is reduced when the propagation loss difference has a negative value or a positive small value, and sets the transmission power adjustment value such that the transmission power is increased when the propagation loss difference has a positive large value.

In the first feature of the present invention, when interference information indicating a level of interference caused by the radio terminal is received in the small cell base station from the neighboring large cell base stations and/or neighboring small cell base stations through communication between base stations, the adjustment value setting unit may select one piece of conversion information from a plurality of pieces of conversion information for converting the propagation loss difference into the transmission power adjustment value, based on the interference information, and set the transmission power adjustment value using the selected conversion information and the propagation loss difference.

In the first feature of the present invention, when interference information indicating a level of interference caused by the radio terminal is not received in the small cell base station from the neighboring large cell base stations and/or neighboring small cell base stations through communication between base stations, the transmission power control unit may control the transmission power without using the interference information.

A second feature of the present invention is summarized as a small cell base station that forms a small cell smaller than a large cell formed by a large cell base station and that is installable in the large cell, comprising: a transmission power control unit configured to control transmission power of a radio signal transmitted from a radio terminal connected to the small cell base station to the small cell base station, based on large cell-side propagation loss indicating propagation loss between the radio terminal and the radio terminal's neighboring large cell base stations.

A third feature of the present invention is summarized as a radio terminal connected to a small cell base station that forms a small cell smaller than a large cell formed by a large cell base station and that is installable in the large cell, comprising: a transmission power control unit configured to control transmission power of a radio signal transmitted from the radio terminal to the small cell base station, based on large cell-side propagation loss indicating propagation loss between the radio terminal and the radio terminal's neighboring large cell base stations.

A fourth feature of the present invention is summarized as a transmission power control method for controlling transmission power of a radio terminal connected to a small cell base station that forms a small cell smaller than a large cell formed by a large cell base station and that is installable in the large cell, comprising: a step of controlling transmission power of a radio signal transmitted from the radio terminal to the small cell base station, based on large cell-side propagation loss indicating propagation loss between the radio terminal and the radio terminal's neighboring large cell base stations.

A fifth feature of the present invention is summarized as a small cell base station (e.g. femto cell base station 100a) that forms a small cell smaller than a large cell formed by a large cell base station (e.g. macro cell base station 300a) and that is installable in the large cell, comprising: a band limitation unit (e.g. band limitation unit 127) configured to limit a frequency band to be allocated to a radio terminal (e.g. radio terminal 200a) connected to the small cell base station, based on large cell-side propagation loss indicating propagation loss between the radio terminal and the radio terminal's neighboring the large cell base stations.

According to the fifth feature of the present invention, a frequency band to be allocated to a radio terminal is limited based on large cell-side propagation loss indicating propagation loss between the radio terminal and the radio terminal's neighboring large cell base stations, so that the radio terminal can reduce interference to the large cell base station or a radio terminal connected to the large cell base station.

In the fifth feature of the present invention, the band limitation unit may strongly limit an uplink frequency band to be allocated to the radio terminal as the large cell-side propagation loss is small.

In the fifth feature of the present invention, the band limitation unit may limit an uplink frequency band to be allocated to the radio terminal when the large cell-side propagation loss becomes lower than a predetermined value, and releases limitation of the uplink frequency band when the large cell-side propagation loss exceeds the predetermined value.

In the fifth feature of the present invention, the band limitation unit may strongly limit a downlink frequency band to be allocated to the radio terminal as the large cell-side propagation loss is large.

In the fifth feature of the present invention, the band limitation unit may limit a downlink frequency band to be allocated to the radio terminal when the large cell-side propagation loss exceeds a predetermined value, and releases limitation of the downlink frequency band to be allocated to the radio terminal when the large cell-side propagation loss becomes lower than the predetermined value.

In the fifth feature of the present invention, the large cell-side propagation loss may be propagation loss between the radio terminal and a large cell base station among the neighboring large cell base stations, which has smallest propagation loss with the radio terminal.

In the fifth feature of the present invention, the large cell-side propagation loss may be an average of propagation loss between the radio terminal and each of the neighboring large cell base stations.

In the fifth feature of the present invention, the large cell-side propagation loss may be an average of propagation loss between the neighboring large cell base stations and the radio terminal, and propagation loss between the radio terminal and a small cell base station, other than the small cell base station connected to the radio terminal, among the radio terminal's neighboring small cell base stations.

A sixth feature of the present invention is summarized as an allocation control method for controlling allocation of a frequency band to a radio terminal connected to a small cell base station that forms a small cell smaller than a large cell formed by a large cell station and that is installable in the large cell, comprising: a step of limiting a frequency band to be allocated to the radio terminal connected to the small cell base station, based on large cell-side propagation loss indicating propagation loss between the radio terminal and the radio terminal's neighboring large cell base stations.

According to the features of the present invention, it is possible to provide a radio communication system, a small cell base station, a radio terminal, a transmission power control method, and an allocation control method, by which it is possible to reduce interference to a large cell base station from a radio terminal connected to a small cell base station.

DESCRIPTION OF THE EMBODIMENT

Figure 1:
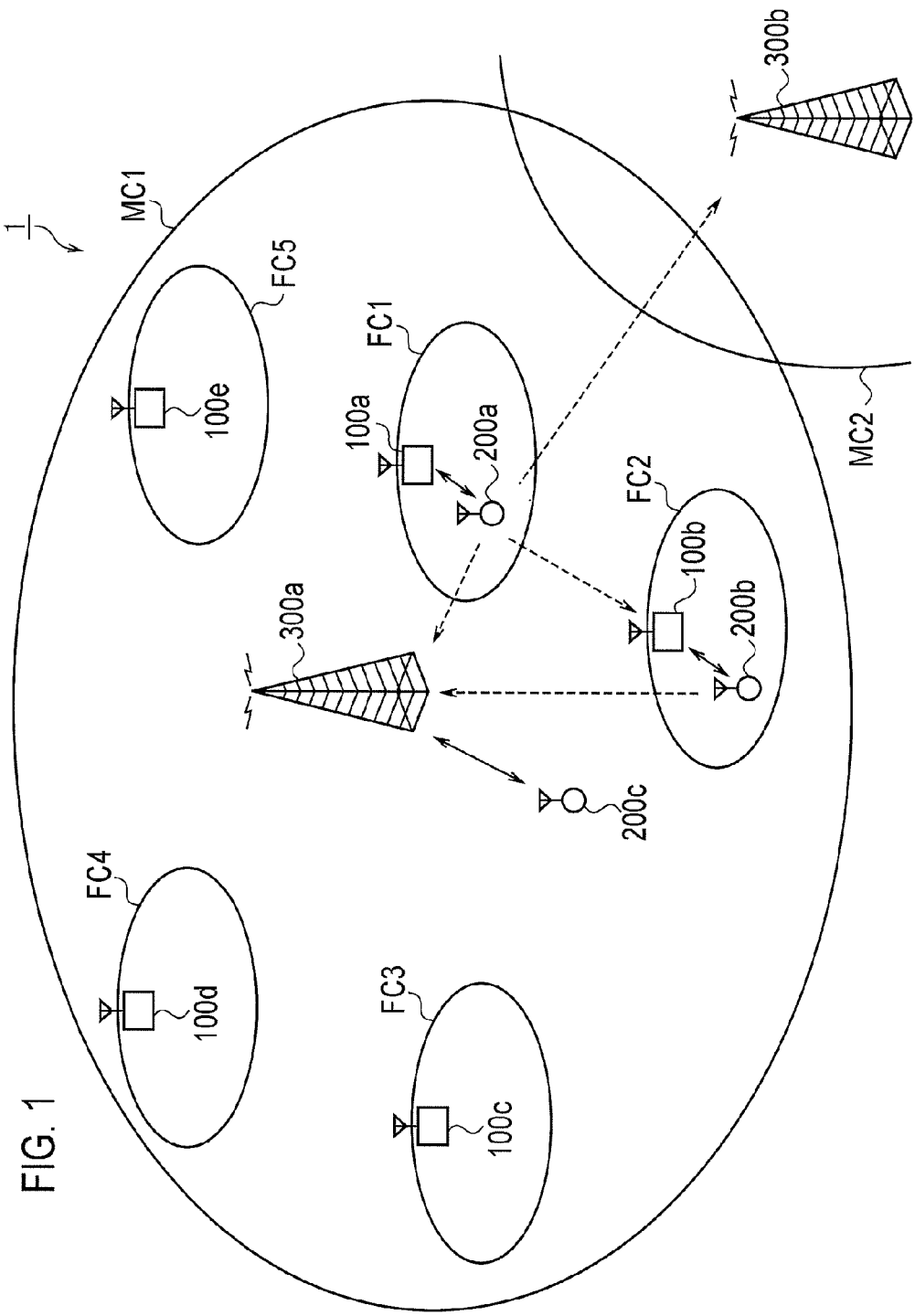
FIG. 1 is a schematic configuration diagram of a radio communication system according to first to third embodiments of the present invention.

Next, with reference to the drawings, first to fourth embodiments, and other embodiments of the present invention will be described. In all drawings for explaining the following embodiments, the same or similar reference numerals are used to designate the same or similar elements.

(1) First Embodiment

A first embodiment will be described in sequence of (1.1) Configuration of radio communication system, (1.2) Details of transmission power method, (1.3) Operation of radio communication system, and (1.4) Effect of first embodiment.

(1.1) Configuration of Radio Communication System (1.1.1) Entire Schematic Configuration FIG. 1 is a schematic configuration diagram of a radio communication system 1 according to the first embodiment. The radio communication system 1, for example, has a configuration based on the LTE-Advanced positioned as the 4th-generation (4G) cellular telephone system.

As illustrated in FIG. 1, the radio communication system 1 includes macro cell base stations (large cell base stations) 300*a* and 300*b*, which respectively form macro cells (large cells) MC1 and MC2, and femto cell base stations (small cell base stations) 100*a* to 100*e* which respectively form femto cells (small cells) FC1 to FC5. The macro cells MC1 and MC2, for example, have radiuses of about several hundreds of meters, and the femto cells FC1 to FC5, for example, have radiuses of about several meters, respectively.

A radio terminal 200a is connected to the femto cell base station 100a and a radio terminal 200b is connected to the femto cell base station 100b. A radio terminal 200c is connected to the macro cell base station 300a.

Hereinafter, the femto cells FC1 to FC5 will be simply referred to as a "femto cell C" when they are not distinguished from one another, the femto cell base stations 100a to 100e will be simply referred to as a "femto cell base station 100" when they are not distinguished from one another, the radio terminals 200a to 200c will be simply referred to as a "radio terminal 200" when they are not distinguished from one another, the macro cells MC1 and MC2 will be simply referred to as a "macro cell MC" when they are not distinguished from each other, and the macro cell base stations 300a and 300b will be simply referred to as a "macro cell base station 300" when they are not distinguished from each other.

The macro cell base station 300 is installed at a place based on base station design in which a communication provider has considered inter-cell interference. Meanwhile, the femto cell base station 100 is configured to be small enough to be installed at an arbitrary place (specifically, in an indoor space) by a user. The femto cell base station 100 is installed in the macro cell MC in order to distribute the traffic of the macro cell base station 300, or cover a dead zone in the macro cell MC.

The macro cell base station 300 is connected to an neighboring macro cell base station via a dedicated line, and can perform base station communication using a high-speed dedicated line. Such an interface between base stations will be referred to as an X2 interface. By way of the X2 interface, it is possible to transmit and receive the OI between base stations, which represents information indicating the level of interference to a base station in an uplink. The macro cell base station 300 performs uplink transmission power control based on the received OI.

Meanwhile, the femto cell base station 100 is connected to a core network of a communication provider via a general public line such as ADSL or FTTH. Furthermore, since the femto cell base station 100 is installed at an arbitrary place, it is difficult to connect the femto cell base station 100 using a dedication line as with between the macro cell base stations 300. Therefore, even when the femto cell base station 100 can receive the OI from another femto cell base station 100 or macro cell base station 300, since the OI passes through a general public line, it is highly probable that a propagation delay time of the OI may be increased as compared with between the macro cell base stations 300, and it is estimated that it is not effective even when the OI is applied to the uplink transmission power control.

When the femto cell base station 100a and the radio terminal 200a, and the macro cell base station 300a and the radio terminal 200c use the same frequency band in order to perform communication, a radio signal transmitted to the femto cell base station 100a from the radio terminal 200a connected to the femto cell base station 100a causes interference to the macro cell base station 300a. Furthermore, when the femto cell base station 100a and the radio terminal 200a, and the femto cell base station 100b and the radio terminal 200b, which are near the femto cell base station 100a and the radio terminal 200a, use the same frequency band in order to perform communication, interference occurs between the radio terminal 200a and the femto cell base station 100b, and between the radio terminal 200b and the femto cell base station 100a.

In the example of FIG. 1, a radio signal transmitted by the radio terminal 200a causes interference to the macro cell base station 300a, the macro cell base station 300b, and the femto cell base station 100b. Moreover, a radio signal transmitted by the radio terminal 200b connected to the femto cell base station 100b causes interference to the macro cell base station 300a. As a consequence, for example, the throughput of uplink communication of the macro cell base station 300a and the radio terminal 200c connected to the macro cell base station 300a is reduced.

In the first embodiment, the femto cell base station 100 performs the uplink transmission power control using the following method without using the OI, resulting in the reduction in interference to the macro cell base station 300.

First, the femto cell base station 100a measures propagation loss between the radio terminal 200a and the femto cell base station 100a. Furthermore, the radio terminal 200a measures received power (RSRP; Reference Signal Received Power) of a reference signal received from the macro cell base station 300a, and transmits information on a measurement result to the femto cell base station 100a as information for evaluating propagation loss between the radio terminal 200a and the macro cell base station 300a. It is assumed that the propagation loss includes distance attenuation, shadowing loss, and feature pass loss. As the information for evaluating the propagation loss, the received power (hereinafter, RSRP) of the reference signal received in the radio terminal 200a from the macro cell base station 300a is used. However, it may be possible to use index and the like of the RSRP. The femto cell base station 100a calculates the propagation loss between the radio terminal 200a and the macro cell base station 300a from information indicating the measurement result of the RSRP by the radio terminal 200a.

Preferably, the femto cell base station 100a calculates uplink propagation loss between the radio terminal 200a and the macro cell base station 300a. When a duplex scheme of the radio communication system 1 is a TDD scheme, since uplink and downlink carrier frequencies are equal to each other, uplink propagation loss is equal to downlink propagation loss. However, when the duplex scheme is an FDD scheme, since the uplink and downlink carrier frequencies are different from each other, the uplink propagation loss is different from the downlink propagation loss. Thus, the femto cell base station 100a calculates downlink propagation loss corresponding to the RSRP measured by the radio terminal 200a, and further calculates uplink propagation loss from the downlink propagation loss. As a technique of calculating the uplink propagation loss from the downlink propagation loss, existing calculation technique may be used.

The femto cell base station 100a determines the transmission power of the radio terminal 200a based on both uplink propagation loss between the radio terminal 200a and the femto cell base station 100a and uplink propagation loss between the radio terminal 200a and the macro cell base station 300a. The femto cell base station 100a transmits information on the determined transmission power to the radio terminal 200a, thereby controlling the transmission power of a radio signal transmitted by the radio terminal 200a.

In addition, the radio terminal 200a may measure the received power of a reference signal received from the macro cell base station 300b or the received power of a reference signal received from the femto cell base station 100b, as well as the received power of a reference signal received from the macro cell base station 300a, and notify the femto cell base station 100a of information on a measurement result. In this case, the femto cell base station 100a calculates uplink propagation loss between the radio terminal 200a and the macro cell base station 300b or uplink propagation loss between the radio terminal 200a and the femto cell base station 100b, and performs transmission power control having considered the calculated propagation loss. In the following first embodiment, the femto cell base station 100a will be mainly described.

(1.1.2) Configuration of Femto Cell Base Station

Figure 2:
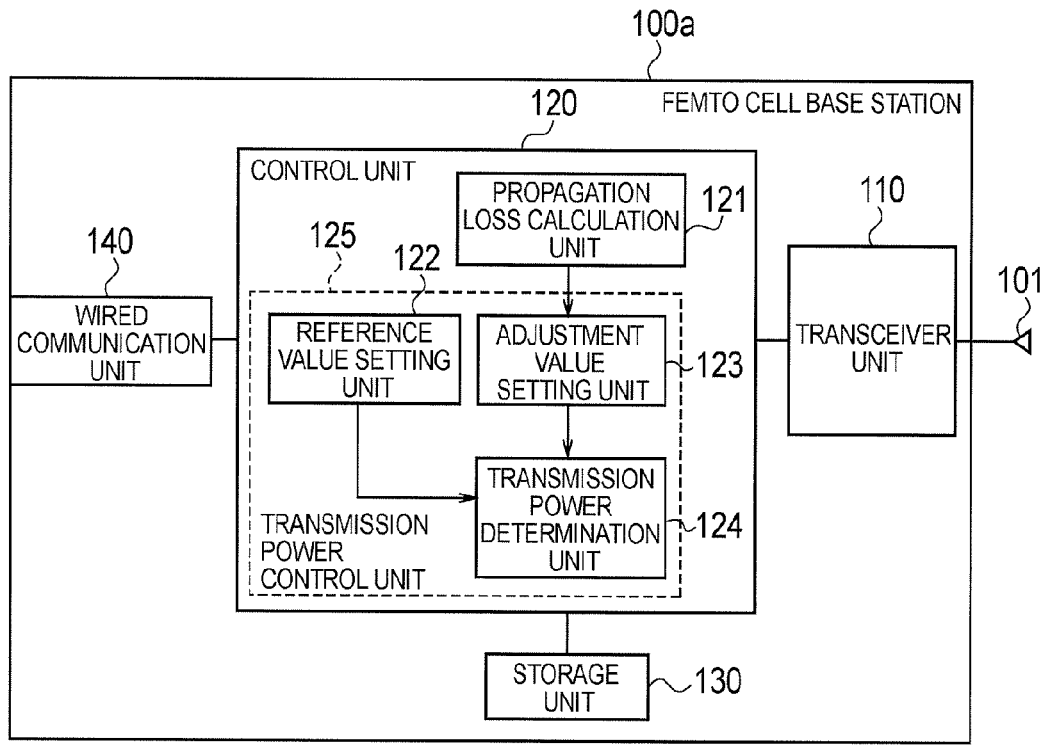
FIG. 2 is a block diagram illustrating the configuration of a femto cell base station according to the first embodiment of the present invention.

Next, the configuration of the femto cell base station 100a will be described. The other femto cell base stations 100b to 100e have the same configuration as that of the femto cell base station 100a. FIG. 2 is a block diagram illustrating the configuration of the femto cell base station 100a.

As illustrated in FIG. 2, the femto cell base station 100a includes an antenna unit 101, a transceiver unit 110, a control unit 120, a storage unit 130, and a wired communication unit 140.

The transceiver unit 110, for example, is configured using a radio frequency (RF) circuit, a baseband (BB) circuit and the like, and transmits and receives a radio signal. Furthermore, the transceiver unit 110 encodes and modulates a transmission signal, and demodulates and decodes a reception signal.

The transceiver unit 110 receives information for evaluating propagation loss between the radio terminal 200a and the macro cell base station 300, which is near the radio terminal 200a, from the radio terminal 200a. Here, it is assumed that the transceiver unit 110 receives information on the received power of the reference signal received in the radio terminal 200a from the macro cell base station 300a, and information on the received power of the reference signal received in the radio terminal 200a from the macro cell base station 300b.

The control unit 120, for example, is configured using a CPU, and controls various functions of the femto cell base station 100a. The storage unit 130, for example, is configured using a memory, and stores various types of information used for the control and the like of the femto cell base station 100a. The wired communication unit 140 communicates with the macro cell base station 300 or another femto cell base station 100 via a general public line and a core network.

The control unit 120 includes a propagation loss calculation unit 121, a reference value setting unit 122, an adjustment value setting unit 123, and a transmission power determination unit 124.

The propagation loss calculation unit 121 calculates uplink propagation loss between the femto cell base station 100a and the radio terminal 200a based on a reference signal received in the transceiver unit 110 from the radio terminal 200a. For example, the propagation loss calculation unit 121 measures RSRP, and subtracts RSRP from the known transmission power of a reference signal, thereby measuring propagation loss.

Furthermore, the propagation loss calculation unit 121 calculates uplink propagation loss between the radio terminal 200a and the macro cell base station 300 near the radio terminal 200a based on information on the RSRP received in the transceiver unit 110 from the radio terminal 200a.

Hereinafter, the propagation loss between the radio terminal 200a and the macro cell base station 300 near the radio terminal 200a will be referred to as "macro cell-side propagation loss (large cell-side propagation loss)", and the propagation loss between the femto cell base station 100a and the radio terminal 200a will be referred to as "femto cell-side propagation loss (small cell-side propagation loss)".

The reference value setting unit 122 sets a transmission power reference value $P_0$, which serves as a reference of the transmission power P of the radio terminal 200a, by using an MCS (Modulation and Coding Scheme) level, the femto cell-side propagation loss and the like. The MCS level represents a combination of a modulation multi-value in adaptive modulation and encoding and an encoding rate. In order to compensate for the femto cell-side propagation loss, the transmission power reference value $P_0$ is set to be large as the femto cell-side propagation loss is large, and the transmission power reference value $P_0$ is set to be small as the femto cell-side propagation loss is small. Accordingly, when the radio terminal 200a is located at the end portion of the femto cell FC1, the transmission power reference value $P_0$ is set to be large.

The adjustment value setting unit 123 sets a transmission power adjustment value (an offset value) $P_{offset}$ for adjusting the transmission power P of the radio terminal 200a by using the macro cell-side propagation loss. In the present embodiment, the adjustment value setting unit 123 sets the transmission power adjustment value $P_{offset}$ using the femto cell-side propagation loss, in addition to the macro cell-side propagation loss. Specifically, the adjustment value setting unit 123 acquires a function $P_{offset}(x)$ for adjustment stored in advance in the storage unit 130, calculates an argument x put into the function $P_{offset}(x)$ for adjustment from the macro cell-side propagation loss and the femto cell-side propagation loss, and uses a calculation result, which is obtained by applying the calculated argument x to the function $P_{offset}(x)$ for adjustment, as the transmission power adjustment value $P_{offset}$.

Figure 3:
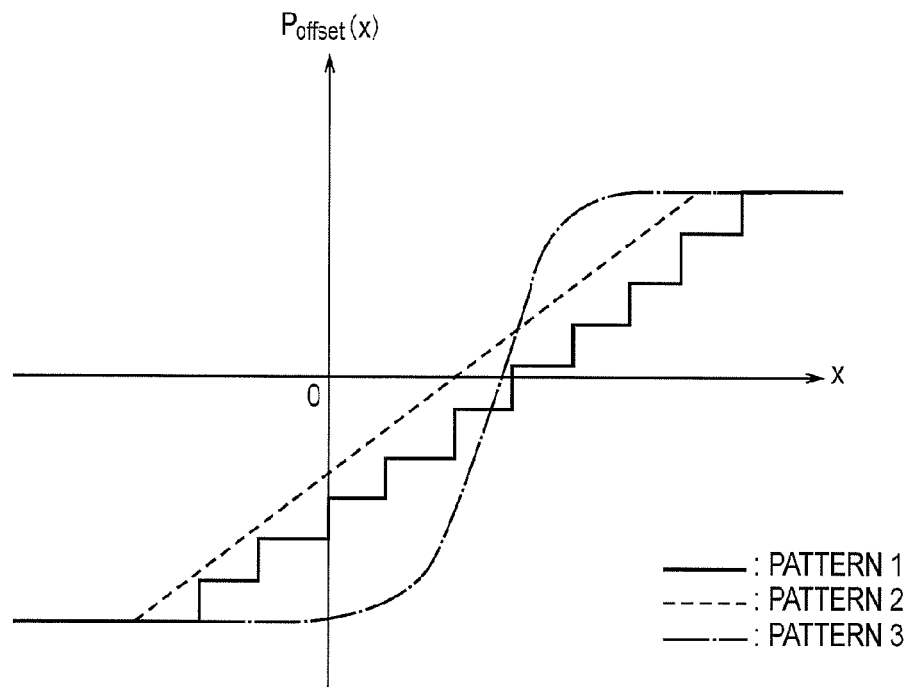
FIG. 3 is a diagram explaining a function for adjustment according to the first embodiment of the present invention.

As illustrated in FIG. 3, the function $P_{offset}(x)$ for adjustment is a broad monotonous increase function, and constitutes conversion information in the present embodiment. The transmission power adjustment value $P_{offset}$ is decreased as the value of the x is small, and is increased as the value of the x is large. A pattern 1 is a pattern for non-linearly setting the transmission power adjustment value $P_{offset}$, a pattern 2 is a pattern for linearly setting the transmission power adjustment value $P_{offset}$, and a pattern 3 is a pattern for curvedly setting the transmission power adjustment value $P_{offset}$. In relation to the $P_{offset}(x)$ it is assumed that an optimal function is set in advance through transmission simulation.

The transmission power determination unit 124 determines the transmission power P of the radio terminal 200a by using the transmission power reference value $P_0$ and the transmission power adjustment value $P_{offset}$. In the present embodiment, a result obtained by adding the transmission power reference value $P_0$ to the transmission power adjustment value $P_{offset}$ is used as the transmission power P.

As described above, in the present embodiment, the reference value setting unit 122, the adjustment value setting unit 123, and the transmission power determination unit 124 constitute a transmission power control unit 125 that controls the transmission power P of the radio terminal 200a.

In addition, the transmission power P is transmission power of a physical uplink shared channel (PUSCH) which is a shared channel for transmitting user data. Furthermore, the transmission power reference value $P_0$, for example, is dynamically (specifically, in each subframe) set according to the MCS level, the femto cell-side propagation loss, the number of resource blocks allocated to the radio terminal 200a, and the like. The transmission power adjustment value $P_{offset}$, for example, is used to determine the initial value of the transmission power P per one resource block at the time of the start of communication.

The transceiver unit 110 transmits information on the transmission power P determined by the transmission power determination unit 124 to the radio terminal 200a. The transceiver unit 110, for example, transmits information on the transmission power P in each subframe to the radio terminal 200a.

(1.2) Details of Transmission Power Method

Next, details of a transmission power control method by the transmission power control unit 125 will be described.

At the time of the setting of the transmission power adjustment value $P_{offset}$, the adjustment value setting unit 123 of the transmission power control unit 125 basically uses propagation loss between the femto cell base station 100a and the macro cell base station 300 (which is near the radio terminal 200a and indicates the macro cell base station 300a) with the smallest macro cell-side propagation loss between the macro cell base station 300 and the radio terminal 200a. Here, it may be possible to use both macro cell-side propagation loss between the macro cell base station 300a and the radio terminal 200a, and macro cell-side propagation loss between the macro cell base station 300b and the radio terminal 200a.

According to a first transmission power control method, the adjustment value setting unit 123 sets a transmission power adjustment value $P_{offset}$, which increases the transmission power P of the radio terminal 200a, when the macro cell-side propagation loss between the macro cell base station 300a and the radio terminal 200a is large, and sets a transmission power adjustment value $P_{offset}$, which decreases the transmission power P of the radio terminal 200a, when the macro cell-side propagation loss between the macro cell base station 300a and the radio terminal 200a is small.

That is, in the first transmission power control method, the adjustment value setting unit 123 uses the argument x applied to the function $P_{offset}(x)$ for adjustment as macro cell-side propagation loss $PL_1$ (a decibel value) between the macro cell base station 300a and the radio terminal 200a.

It is highly probable that the macro cell base station 300a with the smallest macro cell-side propagation loss between the macro cell base station 300a and the radio terminal 200a is affected by large interference from the radio terminal 200a. According to the first transmission power control method, it is possible to reduce the probability that the macro cell base station 300a is affected by large interference from the radio terminal 200a.

According to a second transmission power control method, the adjustment value setting unit 123 calculates propagation loss difference, which is obtained by subtracting femto cell-side propagation loss $PL_0$ (a decibel value) between the femto cell base station 100a and the radio terminal 200a, from the macro cell-side propagation loss $PL_1$ (the decibel value) between the macro cell base station 300a and the radio terminal 200a, sets the transmission power adjustment value $P_{offset}$, which increases the transmission power P of the radio terminal 200a, when the propagation loss difference has a positive large value, and sets the transmission power adjustment value $P_{offset}$, which decreases the transmission power P of the radio terminal 200a, when the propagation loss difference has a negative value or a positive small value.

That is, in the second transmission power control method, the adjustment value setting unit 123 uses the argument x applied to the function $P_{offset}(x)$ for adjustment as propagation loss difference $PL_1-PL_0$ which is calculated from the macro cell-side propagation loss $PL_1$ (the decibel value) and the femto cell-side propagation loss $PL_0$ (the decibel value).

According to the second transmission power control method, when the propagation loss difference is small, the transmission power P of the radio terminal 200a is decreased, so that it is possible to reduce the probability that the macro cell base station 300a is affected by interference from the radio terminal 200a.

According to a third transmission power control method, the adjustment value setting unit 123 calculates an average value of macro cell-side propagation loss between the radio terminal 200a and the macro cell base station 300 (for example, the macro cell base stations 300a and 300b) near the radio terminal 200a, sets the transmission power adjustment value $P_{offset}$, which increases the transmission power P of the radio terminal 200a, when the average value is large, and sets the transmission power adjustment value $P_{offset}$, which decreases the transmission power P of the radio terminal 200a, when the average value is small.

That is, in the third transmission power control method, the adjustment value setting unit 123 uses the argument x applied to the function $P_{offset}(x)$ for adjustment as average propagation loss $PL_{ave}=(PL_1+PL_2+\ldots+PL_N)/N$ which is calculated from propagation loss $PL_1$, $PL_2$ ... $PL_N$ (all are decibel values) between the radio terminal 200a and N number of macro cell base stations 300 neighboring to the radio terminal 200a.

According to the third transmission power control method, it is possible to reduce the influence of interference to the macro cell base station 300b from the radio terminal 200a.

According to a fourth transmission power control method, the adjustment value setting unit 123 calculates propagation loss difference obtained by subtracting the femto cell-side propagation loss $PL_0$ (the decibel value) from the average propagation loss $PL_{ave}$, sets the transmission power adjustment value $P_{offset}$, which increases the transmission power P of the radio terminal 200a, when the propagation loss difference has a positive large value, and sets the transmission power adjustment value $P_{offset}$, which decreases the transmission power P of the radio terminal 200a, when the propagation loss difference has a negative value or a positive small value.

That is, in the fourth transmission power control method, the adjustment value setting unit 123 uses the argument x applied to the function $P_{offset}(x)$ for adjustment as $PL_{ave}-PL_0$. According to the fourth transmission power control method, it is possible to obtain the effect of the second transmission power control method and the effect of the third transmission power control method.

In the first transmission power control method and the third transmission power control method, it is assumed that, in the function $P_{offset}(x)$ for adjustment, $x \geq 0$.

According to other transmission power control methods, in order to calculate the $PL_{ave}$, in addition to the macro cell-side propagation loss, it may be possible to use propagation loss between the radio terminal 200a and the femto cell base station 100, other than the femto cell base station 100a, which is near the radio terminal 200a. In this way, for example, it is possible to reduce interference to the femto cell base station 100b from the radio terminal 200a.

(1.3) Operation of Radio Communication System

Next, the operation of the radio communication system 1 according to the first embodiment will be described.

(1.3.1) Example of Operation Sequence

Figure 4:
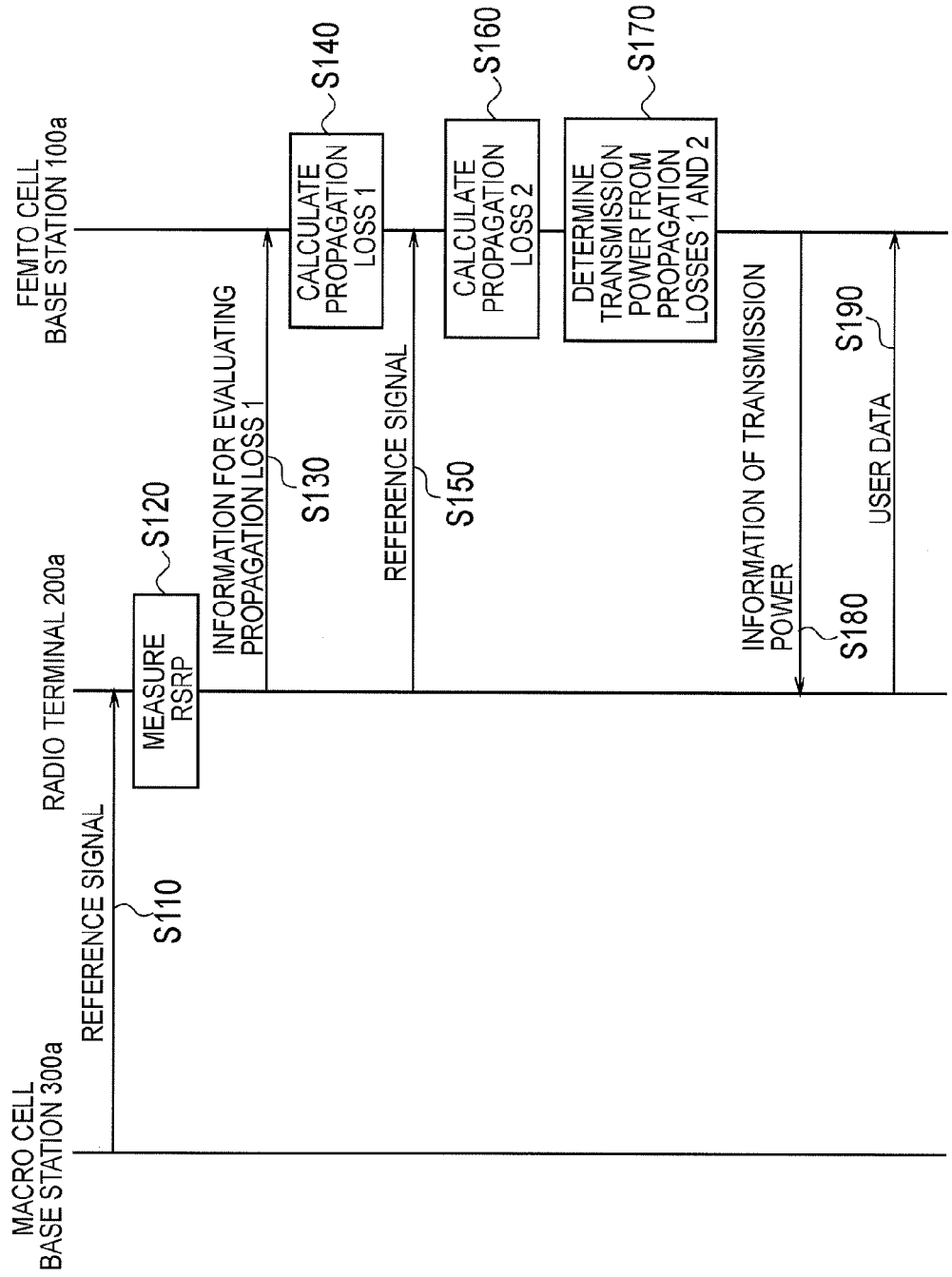
FIG. 4 is a sequence diagram illustrating an operation example of a radio communication system according to the first embodiment of the present invention.

FIG. 4 is a sequence diagram illustrating an operation example of the radio communication system 1 according to the first embodiment.

In step S110, the macro cell base station 300a transmits a reference signal. In addition, the macro cell base station 300a periodically transmits the reference signal. The radio terminal 200a receives the reference signal.

In step S120, the radio terminal 200a measures RSRP based on the reference signal received from the macro cell base station 300a.

Here, the radio terminal 200a may measure the RSRP with respect to all the macro cell base stations 300 that transmit reference signals receivable in the radio terminal 200a. Otherwise, the femto cell base station 100a may specify the macro cell base station 300 for which macro cell-side propagation loss is to be measured, and the radio terminal 200a may measure the RSRP with respect to the specified macro cell base station 300.

In step S130, the radio terminal 200a transmits information on the measured RSRP to the femto cell base station 100a. The transceiver unit 110 of the femto cell base station 100a receives the information on the RSRP.

In step S140, the propagation loss calculation unit 121 of the femto cell base station 100a calculates macro cell-side propagation loss (propagation loss 1 in FIG. 4) based on the information on the RSRP. Specifically, downlink propagation loss is calculated by subtracting the RSRP from the known transmission power of a reference signal, and the propagation loss 1 (uplink propagation loss) is calculated from the calculated downlink propagation loss by using the existing calculation technique as described above.

In step S150, the radio terminal 200a transmits a reference signal. In addition, the radio terminal 200a periodically transmits the reference signal. The transceiver unit 110 of the femto cell base station 100a receives the reference signal.

In step S160, the propagation loss calculation unit 121 of the femto cell base station 100a calculates femto cell-side propagation loss (propagation loss 2 in FIG. 4) between the femto cell base station 100a and the radio terminal 200a based on the reference signal received from the radio terminal 200a.

In step S170, the transmission power control unit 125 determines the transmission power of the radio terminal 200a based on information on the macro cell-side propagation loss and the femto cell-side propagation loss (the propagation loss 1 and 2). Details of step S160 will be described later.

In step S180, the transceiver unit 110 of the femto cell base station 100a transmits information on the transmission power P determined by the transmission power control unit 125 to the radio terminal 200a. The radio terminal 200a receives the information on the transmission power P.

In step S190, the radio terminal 200a transmits user data to the femto cell base station 100a with the transmission power P via PUSCH according to the information on the transmission power P.

In addition, in the present operation sequence, the propagation loss 2 is calculated after the propagation loss 1 is calculated. However, the propagation loss 1 may be calculated after the propagation loss 2 is calculated.

(1.3.2) Transmission Power Determination Flow

Figure 5:
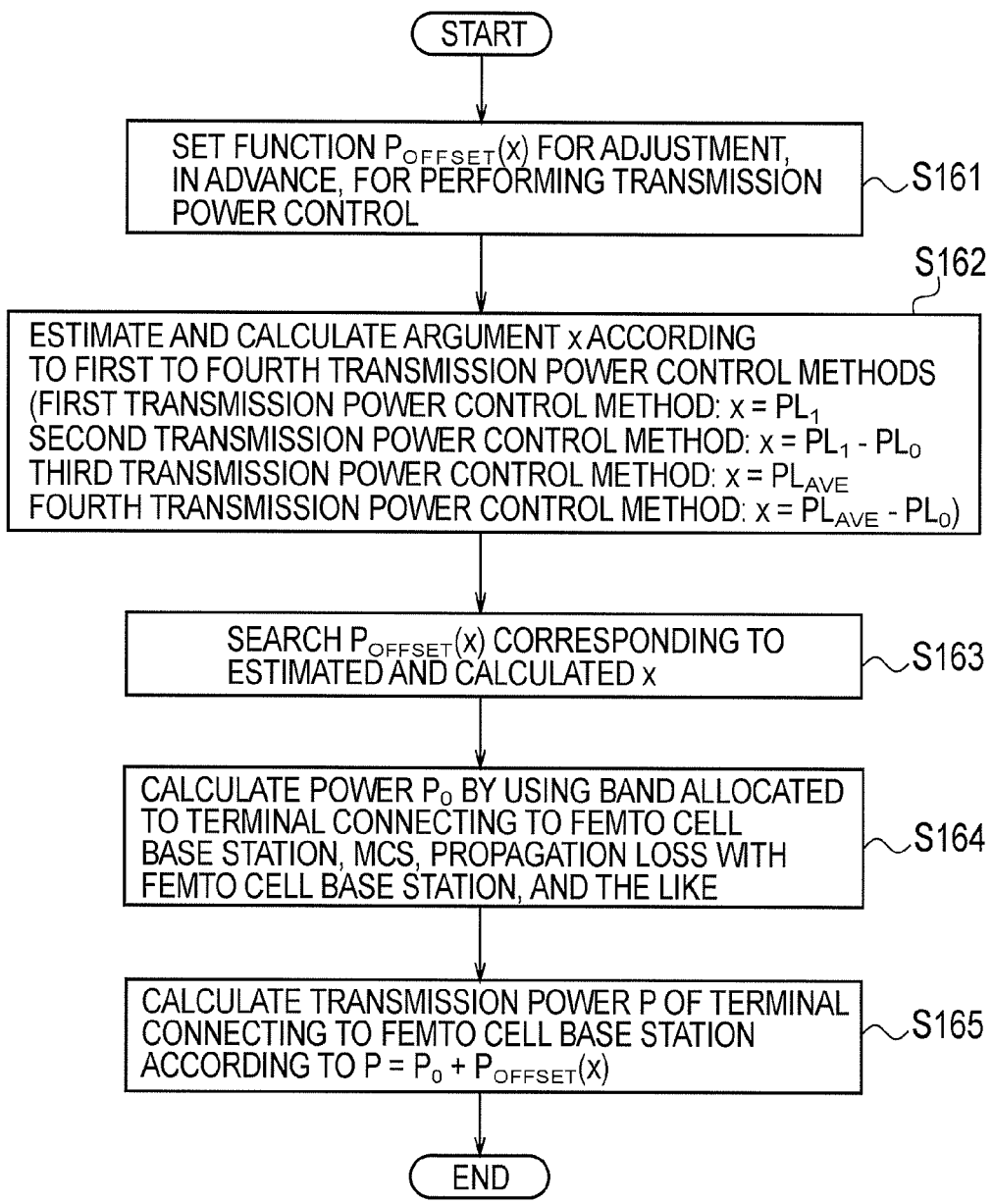
FIG. 5 is a flowchart illustrating details of a transmission power control process according to the first to third embodiments of the present invention.

FIG. 5 is a flowchart illustrating details of the transmission power control process (that is, step S160 of FIG. 4).

First, the adjustment value setting unit 123 sets in advance the function $P_{offset}(x)$ for adjustment which is a broad monotonous increase function for the argument x (step S161).

In step S162, the adjustment value setting unit 123 measures and calculates an argument x corresponding to the x of the function $P_{offset}(x)$ for adjustment according to the first to fourth transmission power control methods. In the first transmission power control method, $x=PL_1$. In the second transmission power control method, $x=PL_1-PL_0$. In the third transmission power control method, $x=PL_{ave}$. In the fourth transmission power control method, $x=PL_{ave}-PL_0$.

In step S163, the adjustment value setting unit 123 searches for (calculates) the value of the $P_{offset}(x)$ corresponding to the measured and calculated x.

In step S164, the reference value setting unit 122 calculates the transmission power reference value $P_0$ using a band (a resource block) allocated to the radio terminal 200a, an MCS level, femto cell-side propagation loss, and the like.

In step S165, the transmission power determination unit 124 adds the transmission power reference value $P_0$ to the transmission power adjustment value $P_{offset}$, thereby determining the transmission power P of the radio terminal 200a.

(1.4) Effect of First Embodiment

According to the first embodiment, the transmission power P of the radio terminal 200a is controlled based on the femto cell-side propagation loss and the macro cell-side propagation loss without using the OI, so that it is possible to reduce inter-cell interference to the macro cell base station 300.

Furthermore, in the case in which there exists the radio terminal 200 connected to the femto cell base station 100 in a place where the macro cell base station 300 does not experience large inter-cell interference due to the power control, the transmission power of the radio terminal 200 is increased when a signal is transmitted to the femto cell base station 100, and therefore, the radio terminal 200 can achieve high transmission quality.

(2) Second Embodiment

In a second embodiment, it is assumed that the OI or information (hereinafter, referred to as "OI information") similar to the OI is transmitted from the macro cell base station 300 to the femto cell base station 100, and the femto cell base station 100 adaptively selects an appropriate function $P_{offset}(x)$ for adjustment from candidates of a plurality of functions $P_{offset}(x)$ for adjustment prepared in advance according to the received OI information.

Figure 6:
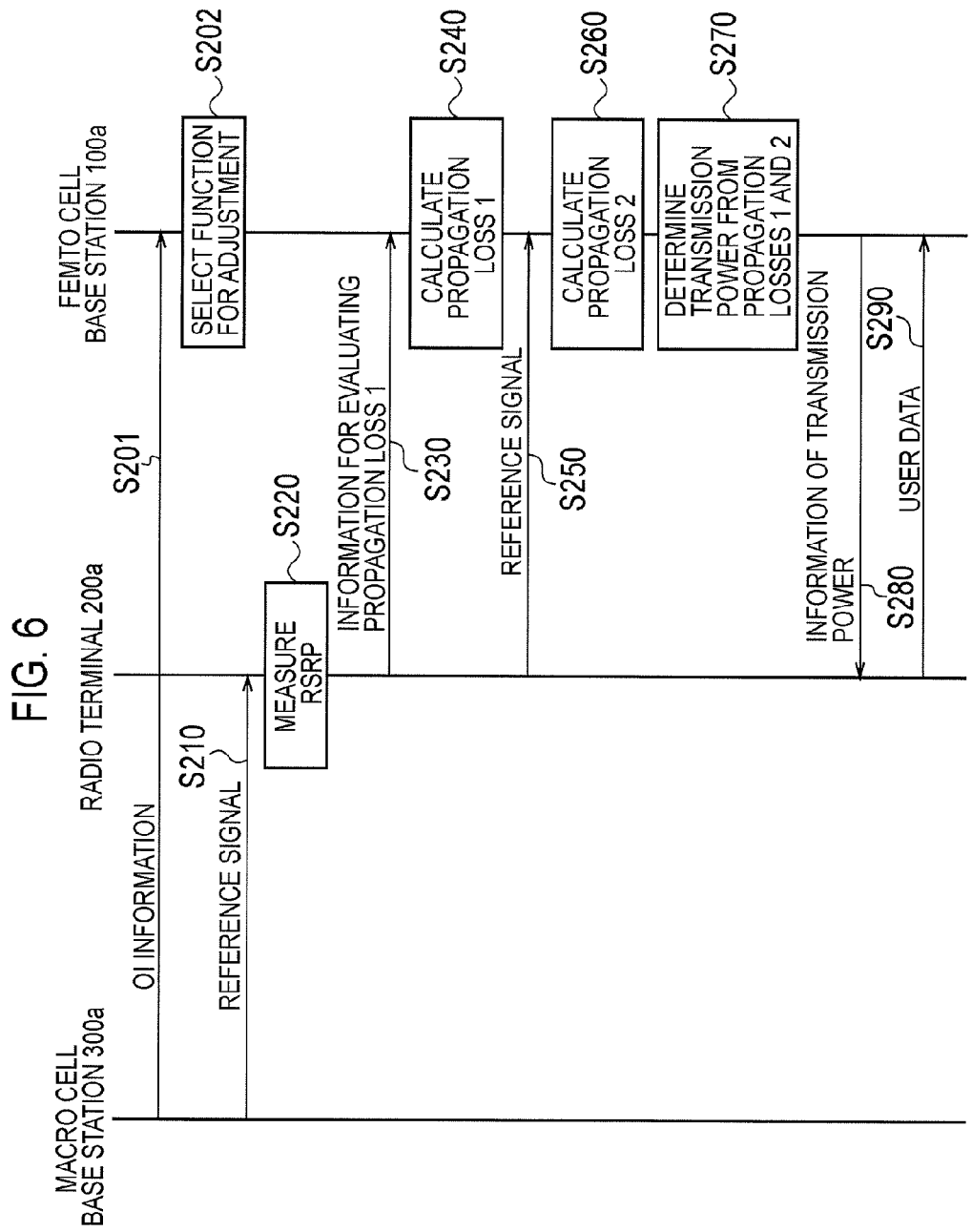
FIG. 6 is a sequence diagram illustrating an operation example of a radio communication system according to the second embodiment of the present invention.

FIG. 6 is a sequence diagram illustrating an operation example of the radio communication system 1 according to the second embodiment of the present invention. A description about an operation the same as the first embodiment will be omitted in order to avoid redundancy.

In step S201, the macro cell base station 300a transmits OI information, which is related to the level of interference to the macro cell base station 300a from the radio terminal 200a, to the femto cell base station 100a through communication between base stations. The wired communication unit 140 of the femto cell base station 100a receives the OI information.

In step S201, the adjustment value setting unit 123 of the femto cell base station 100a selects one function for adjustment from a plurality of functions for adjustment, which are stored in advance in the storage unit 130, based on the OI information received in the wired communication unit 140.

Processes of steps S210, S220, S230, S240, S250, S260, S270, and S280 are performed in the same manner as the first embodiment.

Figure 7:
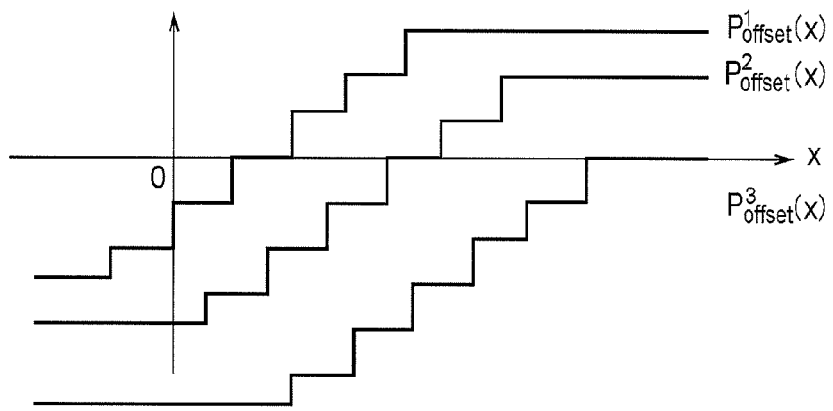
FIG. 7 is a diagram illustrating an example of a candidate of a function for adjustment according to the second embodiment of the present invention.

FIG. 7 is a diagram illustrating an example of candidates of the function for adjustment. FIG. 7 illustrates three candidates of the function for adjustment. However, the present invention is not limited to the number of the candidates.

If a notification, which indicates that the radio terminal 200a causes interference to the macro cell base station 300a, is received by the OI information from the macro cell base station 300a, the adjustment value setting unit 123 of the femto cell base station 100a selects a function for adjustment which further decreases transmission power P. In the example of FIG. 7, the function for adjustment is selected in sequence of $P^1_{offset}(x)$, $P^2_{offset}(x)$, and $P^3_{offset}(x)$.

Furthermore, if the notification, which indicates that the radio terminal 200a causes interference to the macro cell base station 300a, is not received, the adjustment value setting unit 123 selects a function for adjustment which decreases the transmission power P in a small degree. The example of FIG. 7 illustrates $P^3_{offset}(x)$ to $P^2_{offset}(x)$, $P^3_{offset}(x)$ to $P^1_{offset}(x)$, and the like.

In the above example, only the OI information from the macro cell base station 300 is considered. For the selection of the function $P_{offset}(x)$ for adjustment, OI information from a neighboring femto cell base station 100 may be considered.

According to the second embodiment, it is possible to appropriately select a function for adjustment, and it is possible to expect the improvement of the throughput of the femto cell base station 100 as well as the reduction in interference to the macro cell base station 300.

(3) Third Embodiment

In the above-mentioned first and second embodiments, the execution of the uplink transmission power control is lead by the femto cell base station 100. However, in a third embodiment, the execution of the uplink transmission power control is lead by the radio terminal 200.

For example, for the transmission power control of the radio terminal 200*a* connected to the femto cell base station 100*a*, the radio terminal 200*a* calculates propagation loss by a reference signal transmitted from the femto cell base station 100*a* and the macro cell base station 300*a*, and determines increase or decrease in the transmission power using the calculated propagation loss, thereby performing the transmission power control.

(3.1) Configuration of Radio Terminal

Figure 8:
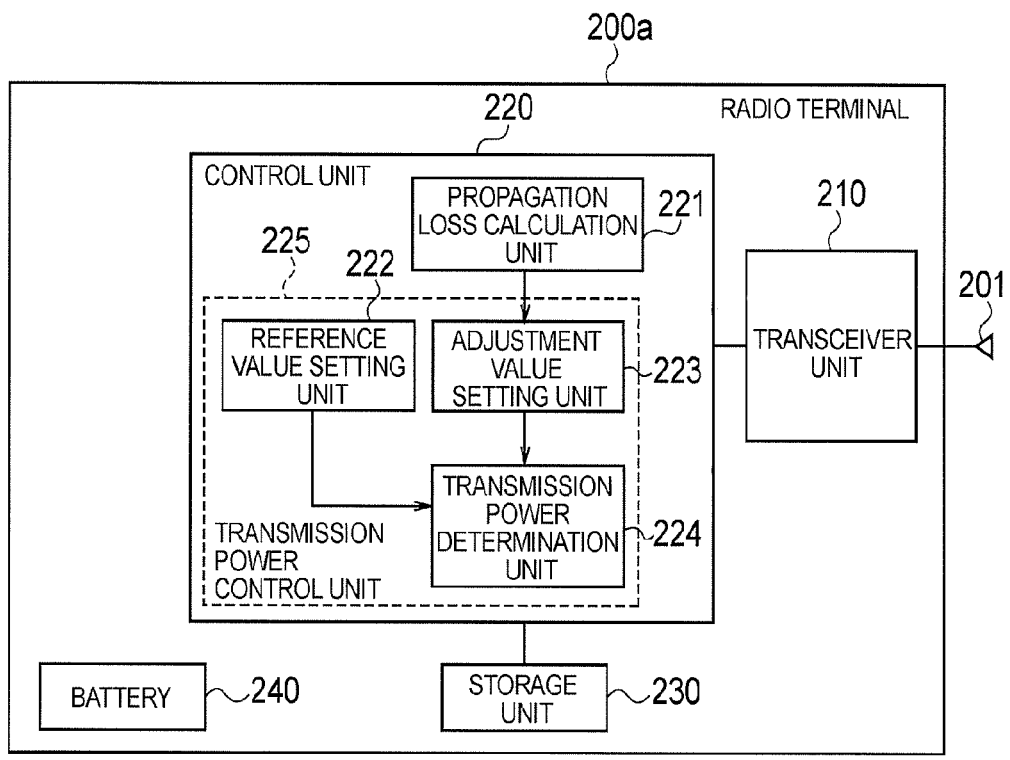
FIG. 8 is a block diagram illustrating the configuration of a radio terminal according to the third embodiment of the present invention.

Next, the configuration of the radio terminal 200*a* according to the third embodiment will be described. Another radio terminal 200 has the same configuration as that of the radio terminal 200*a*. FIG. 8 is a block diagram illustrating the configuration of the radio terminal 200*a* according to the third embodiment.

As illustrated in FIG. 8, the radio terminal 200*a* includes an antenna unit 201, a transceiver unit 210, a control unit 220, a storage unit 230, and a battery 240.

The transceiver unit 210, for example, is configured using an RF circuit, a BB circuit and the like, and transmits and receives a radio signal. Furthermore, the transceiver unit 210 encodes and modulates a transmission signal, and demodulates and decodes a reception signal.

The control unit 220, for example, is configured using a CPU, and controls various functions of the radio terminal 200*a*. The storage unit 230, for example, is configured using a memory, and stores various types of information used for the control and the like of the radio terminal 200*a*. The battery 240 is charged with the power to be supplied to each block of the radio terminal 200*a*.

The control unit 220 includes a propagation loss calculation unit 221, a reference value setting unit 222, an adjustment value setting unit 223, and a transmission power determination unit 224.

The propagation loss calculation unit 221 calculates femto cell-side propagation loss between the femto cell base station 100*a* and the radio terminal 200*a* based on a reference signal received in the transceiver unit 210 from the femto cell base station 100*a*. For example, the propagation loss calculation unit 221 calculates macro cell-side propagation loss between the macro cell base station 300*a* and the radio terminal 200*a* based on a reference signal received in the transceiver unit 210 from the macro cell base station 300*a*.

The reference value setting unit 222 has the same function as that of the reference value setting unit 122 in the first embodiment, and sets a transmission power reference value $P_0$, which serves as a reference of the transmission power P of the radio terminal 200*a*.

The adjustment value setting unit 223 has the same function as that of the adjustment value setting unit 123 in the first embodiment, and sets a transmission power adjustment value $P_{offset}$ for adjusting the transmission power P of the radio terminal 200*a*. The adjustment value setting unit 223 performs the above-mentioned first to fourth transmission power control methods.

The transmission power determination unit 224 has the same function as that of the transmission power determination unit 124 in the first embodiment, and determines the transmission power P of the radio terminal 200*a* by using the transmission power reference value $P_0$ and the transmission power adjustment value $P_{offset}$.

As described above, in the present embodiment, the reference value setting unit 222, the adjustment value setting unit 223, and the transmission power determination unit 224 constitute a transmission power control unit 225 that controls the transmission power P of the radio terminal 200*a*.

(3.2) Operation of Radio Communication System

Figure 9:
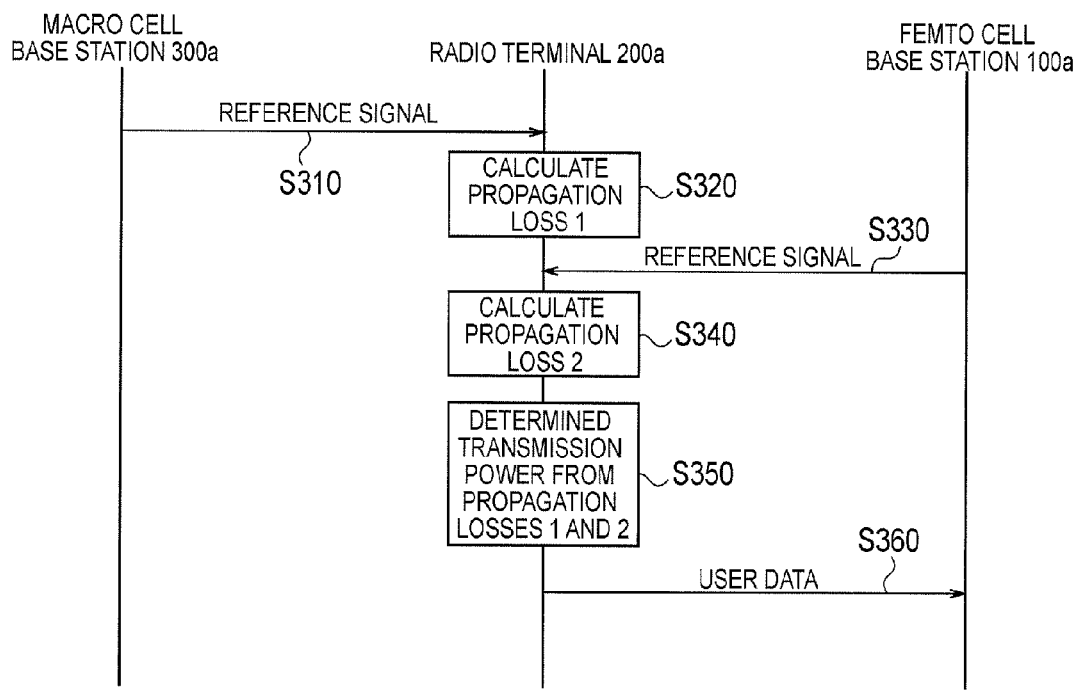
FIG. 9 is a sequence diagram illustrating an operation example of a radio communication system according to the third embodiment of the present invention.

FIG. 9 is a sequence diagram illustrating an operation example of the radio communication system 1 according to the third embodiment of the present invention.

In step S310, the macro cell base station 300*a* transmits a reference signal. In addition, the macro cell base station 300*a* periodically transmits the reference signal. The transceiver unit 210 of the radio terminal 200*a* receives the reference signal.

In step S320, the propagation loss calculation unit 221 of the radio terminal 200*a* calculates macro cell-side propagation loss (propagation loss 1 in FIG. 9) between the macro cell base station 300*a* and the radio terminal 200*a* based on the reference signal received in the transceiver unit 210 from the macro cell base station 300*a*. Specifically, the propagation loss calculation unit 221 calculates downlink propagation loss by subtracting the received power of the received reference signal from the known transmission power of a reference signal, and calculates the propagation loss 1 (uplink propagation loss) from the calculated downlink propagation loss by using the existing calculation technique as described above.

Here, the radio terminal 200*a* may calculate macro cell-side propagation loss with respect to all the macro cell base stations 300 that transmit reference signals receivable in the radio terminal 200*a*. Otherwise, the femto cell base station 100*a* may specify the macro cell base station 300 for which macro cell-side propagation loss is to be calculated.

In step S330, the femto cell base station 100*a* transmits a reference signal. In addition, the femto cell base station 100*a* periodically transmits the reference signal. The transceiver unit 210 of the radio terminal 200*a* receives the reference signal.

In step S340, the propagation loss calculation unit 221 of the radio terminal 200*a* calculates femto cell-side propagation loss (propagation loss 2 in FIG. 9) between the femto cell base station 100*a* and the radio terminal 200*a* based on the reference signal received in the transceiver unit 210 from the femto cell base station 100*a*. Specifically, the propagation loss calculation unit 221 calculates downlink propagation loss by subtracting the received power of the received reference signal from the known transmission power of a reference signal, and calculates the propagation loss 2 (uplink propagation loss) from the calculated downlink propagation loss by using the existing calculation technique as described above.

In step S350, the transmission power control unit 225 of the radio terminal 200*a* determines the transmission power P of the radio terminal 200*a* based on information on the propagation loss 1 and 2. In step S350, the adjustment value setting unit 223 performs the process described in FIG. 5.

In step S360, the transceiver unit 210 of the radio terminal 200*a* transmits user data to the femto cell base station 100*a* with the transmission power P via PUSCH according to the information on the transmission power P.

In addition, in the present operation sequence, the propagation loss 2 is measured after the propagation loss 1 is measured. However, the propagation loss 1 may be measured after the propagation loss 2 is measured.

(3.3) Effect of Third Embodiment

According to the third embodiment, the transmission power P of the radio terminal 200a is controlled based on the femto cell-side propagation loss and the macro cell-side propagation loss, so that it is possible to reduce inter-cell interference to the macro cell base station 300. Furthermore, in the case in which there exists the radio terminal 200 connected to the femto cell base station 100 in a place where the macro cell base station 300 does not experience large inter-cell interference due to the power control, the transmission power of the radio terminal 200 is increased when a signal is transmitted to the femto cell base station 100, and therefore, the radio terminal 200 can achieve high transmission quality.

(4) Fourth Embodiment

In the above-mentioned first to third embodiments, the uplink transmission power control method has been described. However, in a fourth embodiment, uplink and downlink radio resource allocation control (resource scheduling) will be described.

The fourth embodiment will be described in sequence of (4.1) Configuration of radio communication system, (4.2) Outline of allocation control method, (4.3) Operation of radio communication system, and (4.4) Effect of fourth embodiment. The fourth embodiment will be described while focusing on the difference relative to the first embodiment, and redundant description will be omitted.

Figure 10:
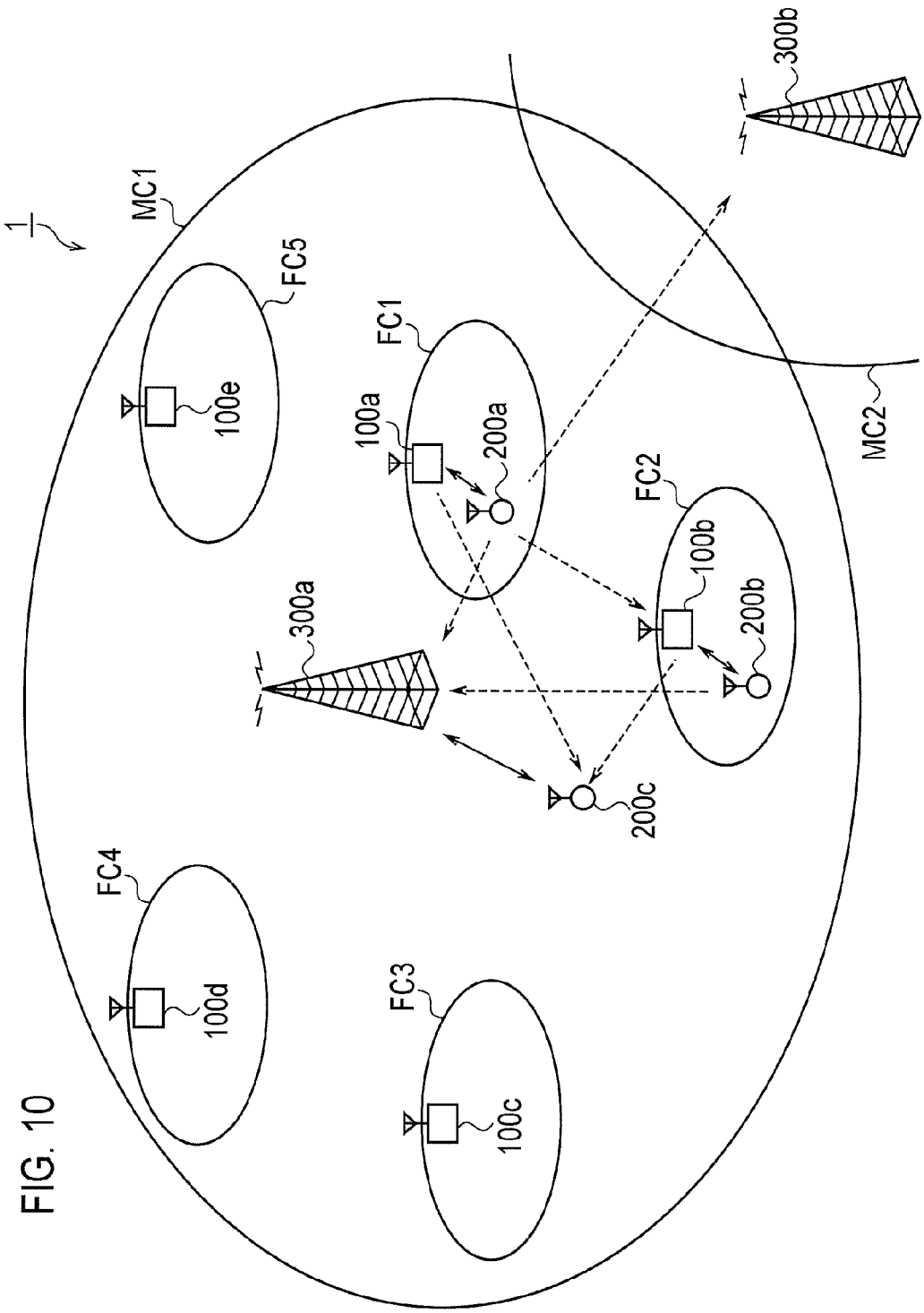
FIG. 10 is a schematic configuration diagram of a radio communication system according to a fourth embodiment of the present invention.

(4.1) Configuration of Radio Communication System (4.1.1) Entire Schematic Configuration FIG. 10 is a schematic configuration diagram of the radio communication system 1 according to the fourth embodiment of the present invention. The radio communication system 1, for example, has a configuration based on the LTE-Advanced positioned as the 4th-generation (4G) cellular telephone system.

As illustrated in FIG. 10, the radio communication system 1 includes the macro cell base stations (large cell base stations) 300a and 300b, which respectively form the macro cells (large cells) MC1 and MC2, and the femto cell base stations (small cell base stations) 100a to 100e, which respectively form the femto cells (small cells) FC1 to FC5.

The radio terminal 200a is connected to the femto cell base station 100a and the radio terminal 200b is connected to the femto cell base station 100b. The radio terminal 200c is connected to the macro cell base station 300a.

The macro cell base station 300 is installed at a place based on base station design in which a communication provider has considered inter-cell interference. Meanwhile, the femto cell base station 100 is configured to be small enough to be installed at an arbitrary place (specifically, in an indoor space) by a user. The femto cell base station 100 is installed in the macro cell MC in order to distribute the traffic of the macro cell base station 300, or cover a dead zone in the macro cell MC.

In an uplink, when the femto cell base station 100a and the radio terminal 200a, and the macro cell base station 300a and the radio terminal 200c use the same frequency band in order to perform communication, a radio signal transmitted to the femto cell base station 100a from the radio terminal 200a connected to the femto cell base station 100a causes interference to the macro cell base station 300a. Furthermore, when the femto cell base station 100a and the radio terminal 200a, and the femto cell base station 100b and the radio terminal 200b, which are near the femto cell base station 100a and the radio terminal 200a, use the same frequency band in order to perform communication, interference occurs between the radio terminal 200a and the femto cell base station 100b, and between the radio terminal 200b and the femto cell base station 100a.

In the example of FIG. 10, a radio signal transmitted by the radio terminal 200a causes interference to the macro cell base station 300a, the macro cell base station 300b, and the femto cell base station 100b. Moreover, a radio signal transmitted by the radio terminal 200b connected to the femto cell base station 100b causes interference to the macro cell base station 300a. As a consequence, for example, the throughput of uplink communication of the macro cell base station 300a and the radio terminal 200c connected to the macro cell base station 300a is reduced.

Furthermore, in a downlink, when the femto cell base station 100a and the radio terminal 200a, and the macro cell base station 300a and the radio terminal 200c use the same frequency band in order to perform communication, a radio signal transmitted to the radio terminal 200a from the femto cell base station 100a causes interference to the radio terminal 200c. In the example of FIG. 10, a radio signal transmitted from the femto cell base station 100a causes interference to the radio terminal 200c. As a consequence, the throughput of downlink communication between the radio terminal 200c and the macro cell base station 300a is reduced.

In the fourth embodiment, the femto cell base station 100 performs uplink and downlink resource allocation control by the following method, resulting in the reduction in the interference to the radio terminal 200c.

First, the radio terminal 200a measures received power (RSRP; Reference Signal Received Power) of a reference signal received from the macro cell base station 300a, and transmits information on a measurement result to the femto cell base station 100a as information for evaluating propagation loss between the radio terminal 200a and the macro cell base station 300a. It is assumed that the propagation loss includes distance attenuation, shadowing loss, and feature pass loss. As the information for evaluating the propagation loss, the received power (hereinafter, RSRP) of the reference signal received in the radio terminal 200a from the macro cell base station 300a is used. However, it may be possible to use index and the like of the RSRP. The femto cell base station 100a calculates the propagation loss between the radio terminal 200a and the macro cell base station 300a from information indicating the measurement result of the RSRP by the radio terminal 200a.

Preferably, the femto cell base station 100a calculates uplink and downlink propagation losses between the radio terminal 200a and the macro cell base station 300a. When a duplex scheme of the radio communication system 1 is a TDD scheme, since uplink and downlink carrier frequencies are equal to each other, uplink propagation loss is equal to downlink propagation loss. However, when the duplex scheme is an FDD scheme, since the uplink and downlink carrier frequencies are different from each other, the uplink propagation loss is different from the downlink propagation loss. Thus, the femto cell base station 100a calculates downlink propagation loss corresponding to the RSRP measured by the radio terminal 200a, and further calculates uplink propagation loss from the downlink propagation loss. As a technique of calculating the uplink propagation loss from the downlink propagation loss, existing calculation technique may be used.

The femto cell base station 100a limits uplink and downlink frequency bands, which are allocated to the radio terminal 200a, based on the uplink and downlink propagation loss between the radio terminal 200a and the macro cell base station 300a.

The radio terminal 200a may measure the received power of a reference signal received from the macro cell base station 300b or the received power of a reference signal received from the femto cell base station 100b, as well as the received power of a reference signal received from the macro cell base station 300a, and notify the femto cell base station 100a of information on a measurement result. In this case, the femto cell base station 100a calculates uplink and downlink propagation loss between the radio terminal 200a and the macro cell base station 300b or uplink and downlink propagation loss between the radio terminal 200a and the femto cell base station 100b, and performs uplink and downlink resource allocation control having considered the calculated propagation loss. In the following fourth embodiment, the femto cell base station 100a will be mainly described.

(4.1.2) Configuration of Femto Cell Base Station

Figure 11:
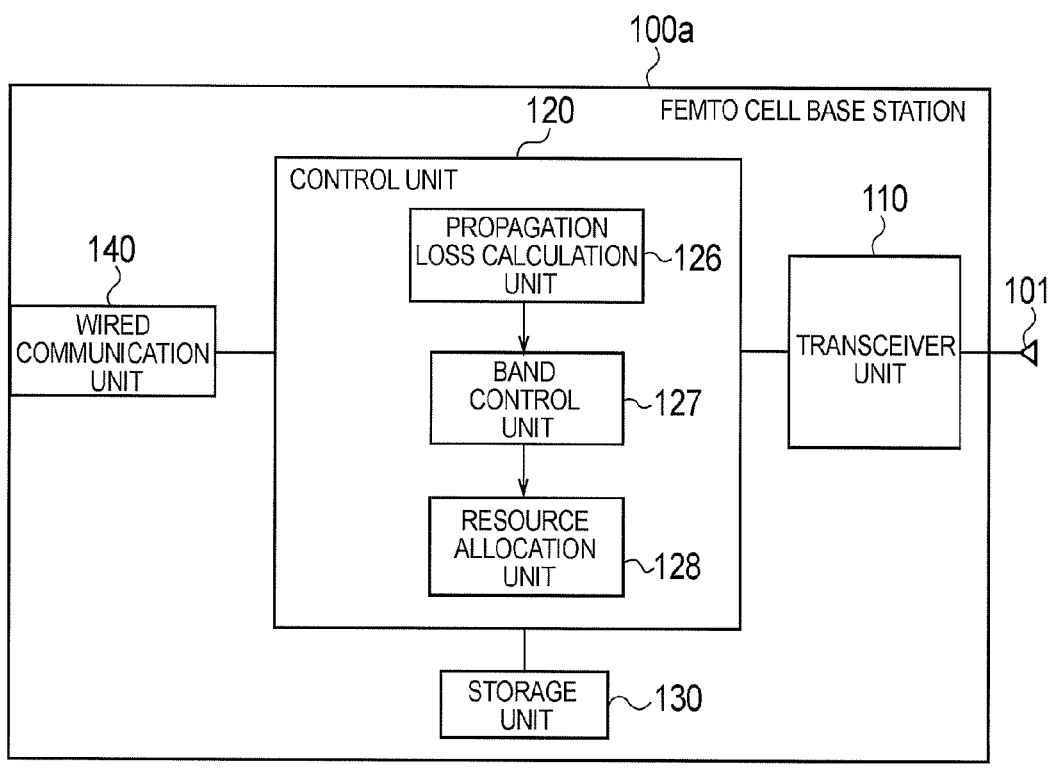
FIG. 11 is a block diagram illustrating the configuration of a femto cell base station according to the fourth embodiment of the present invention.

Next, the configuration of the femto cell base station 100a according to the fourth embodiment will be described. The other femto cell base stations 100b to 100e have the same configuration as that of the femto cell base station 100a. FIG. 11 is a block diagram illustrating the configuration of the femto cell base station 100a according to the fourth embodiment.

As illustrated in FIG. 11, the femto cell base station 100a includes the antenna unit 101, the transceiver unit 110, the control unit 120, the storage unit 130, and the wired communication unit 140.

The transceiver unit 110, for example, is configured using a radio frequency (RF) circuit, a baseband (BB) circuit and the like, and transmits and receives a radio signal. Furthermore, the transceiver unit 110 encodes and modulates a transmission signal, and demodulates and decodes a reception signal.

The transceiver unit 110 receives information for evaluating propagation loss between the radio terminal 200a and the macro cell base station 300, which is near the radio terminal 200a, from the radio terminal 200a. Here, it is assumed that the transceiver unit 110 receives information on the received power of the reference signal received in the radio terminal 200a from the macro cell base station 300a, and information on the received power of the reference signal received in the radio terminal 200a from the macro cell base station 300b.

The control unit 120, for example, is configured using a CPU, and controls various functions of the femto cell base station 100a. The storage unit 130, for example, is configured using a memory, and stores various types of information used for the control and the like of the femto cell base station 100a. The wired communication unit 140 communicates with the macro cell base station 300 or another femto cell base station 100 via a general public line and a core network.

The control unit 120 includes a propagation loss calculation unit 126, a band limitation unit 127, and a resource allocation unit 128.

The propagation loss calculation unit 126 calculates uplink and downlink propagation loss between the radio terminal 200a and the macro cell base station 300, which is near the radio terminal 200a, based on information on the RSRP received in the transceiver unit 110 from the radio terminal 200a.

The propagation loss calculation unit 126 may calculate, as macro cell-side propagation loss, propagation loss between the femto cell base station 100a and the macro cell base station 300 (which is near the radio terminal 200a and indicates the macro cell base station 300a) with the smallest propagation loss between the macro cell base station 300 and the radio terminal 200a. Otherwise, the propagation loss calculation unit 126 may calculate, as macro cell-side propagation loss, an average of propagation loss between the radio terminal 200a and the macro cell base station 300 (for example, the macro cell base stations 300a and 300b) which is near the radio terminal 200a. The propagation loss calculation unit 126 may calculate, as macro cell-side propagation loss, an average of propagation loss between the radio terminal 200a and the macro cell base station 300 (for example, the macro cell base stations 300a and 300b), which is near the radio terminal 200a, and propagation loss between the radio terminal 200a and the femto cell base station 100b.

The band limitation unit 127 limits a frequency band, which is to be allocated to the radio terminal 200a, based on the large cell-side propagation loss calculated by the propagation loss calculation unit 126. The resource allocation unit 128 allocates uplink and downlink radio resources (resource blocks) to the radio terminal 200a. Details of the band limitation unit 127 and the resource allocation unit 128 will be described later. The transceiver unit 110 transmits information on the radio resources allocated to the radio terminal 200a by the resource allocation unit 128 to the radio terminal 200a.

(4.2) Outline of Allocation Control Method

Next, the outline of an allocation control method by the band limitation unit 127 and the resource allocation unit 128 will be described.

(4.2.1) Uplink Allocation Control Method

Figure 12:
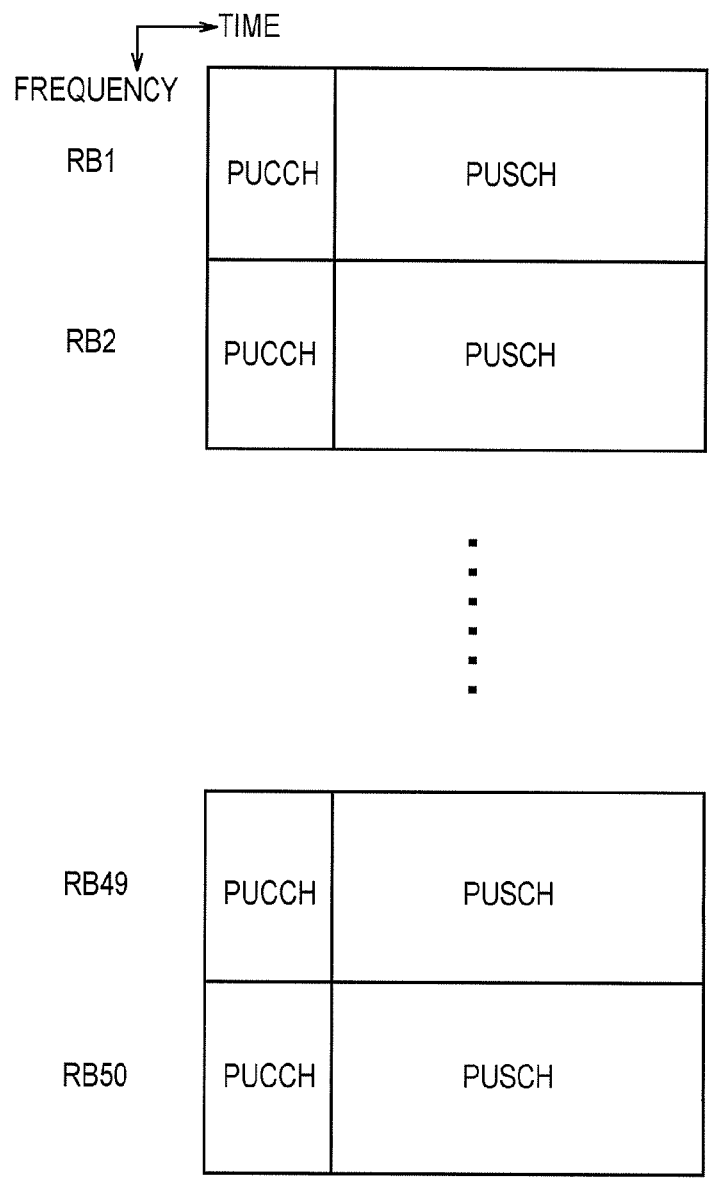
FIG. 12 is a diagram illustrating an example of all frequency bands, which are allocatable to a radio terminal connected to a femto cell base station by the femto cell base station, in an uplink.

FIG. 12 is a diagram illustrating an example of all frequency bands, which are allocatable to a radio terminal connected to the femto cell base station 100a by the femto cell base station 100a, in an uplink. An uplink frequency band is divided into each of a plurality of resource blocks (RBs). Both ends of the uplink frequency band are used as physical uplink control channels (PUCCHs) for transmitting control data. In the example of FIG. 12, RB1, RB2, RB49, and RB50 are used as the PUCCHs. Remaining resource blocks are used as physical uplink shared channels (PUSCHs) for transmitting user data. Typically, it is possible for the resource allocation unit 128 to allocate at least one resource block of the plurality of resource blocks to the radio terminal based on the received quality (for example, SNR) and the like of a reference signal received in the femto cell base station 100a from the radio terminal 200a.

However, when uplink propagation loss between the radio terminal 200a and the macro cell base station 300, which is near the radio terminal 200a, is small, and a frequency band used by the radio terminal 200a in an uplink overlaps a frequency band used by the macro cell base station 300 in the uplink, it is highly probable that the radio terminal 200a causes large interference to the macro cell base station 300.

Thus, when the uplink propagation loss (the macro cell-side propagation loss) between the radio terminal 200a and the macro cell base station 300, which is near the radio terminal 200a, is small, the band limitation unit 127 limits an uplink frequency band to be allocated to the radio terminal 200a. Specifically, it is possible to employ a method for setting an upper limit in the number of resource blocks to be allocated as the PUSCH, or a method for prohibiting the allocation of a part of resource blocks 1 to 50 to be allocated as the PUSCH.

In this way, it is possible to reduce the probability that the frequency band used by the radio terminal 200a overlaps the frequency band used by the macro cell base station 300 in the uplink, resulting in the suppression of interference to the macro cell base station 300 from the radio terminal 200*a*.

In addition, since a PUCCH section of each resource block includes various pieces of control data for controlling the transmission of user data, it is not preferable to limit the allocation of the PUCCH section.

(4.2.1) Downlink Allocation Control Method

Figure 13:
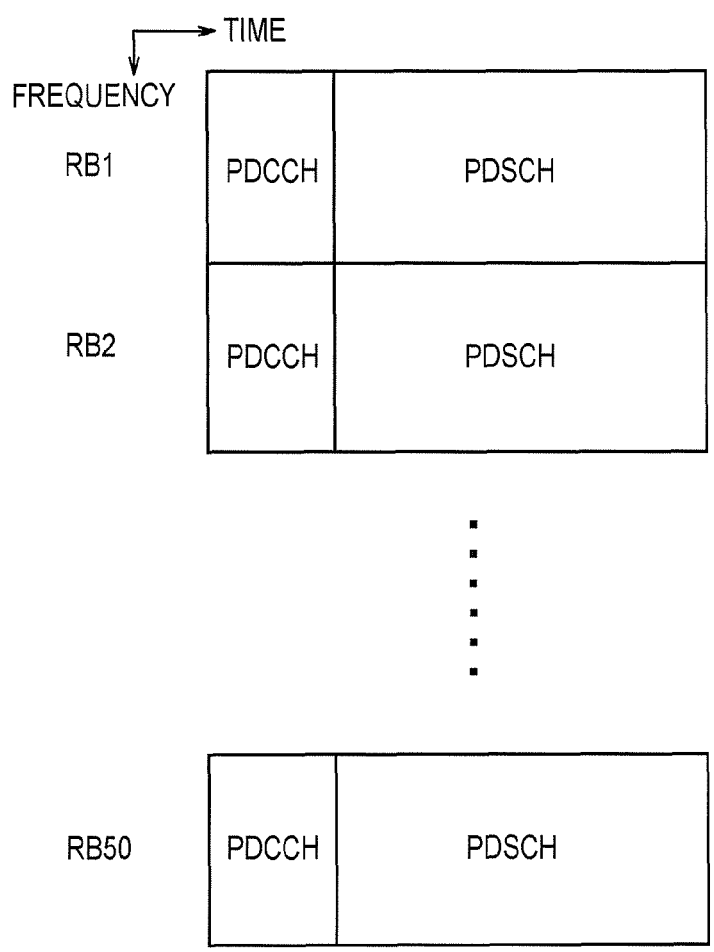
FIG. 13 is a diagram illustrating an example of all frequency bands, which are allocatable to a radio terminal connected to a femto cell base station by the femto cell base station, in a downlink.

FIG. 13 is a diagram illustrating an example of all frequency bands, which are allocatable to the radio terminal 200*a* connected to the femto cell base station 100*a* by the femto cell base station 100*a*, in a downlink. A downlink frequency band is divided into each of a plurality of resource blocks (RBs). In the example of FIG. 13, the downlink frequency band is divided into 50 resource blocks. A head section containing several symbols of each resource block is used as a physical downlink control channel (PDCCH) for transmitting control data. A remaining symbol section of each resource block is used as a physical downlink shared channel (PDSCH) for transmitting user data. Typically, it is possible for the resource allocation unit 128 to allocate at least one resource block of resource blocks 1 to 50 to the radio terminal based on CQI (Channel Quality Indicator) notified from the radio terminal 200*a*.

When propagation loss between the macro cell base station 300*a* and the radio terminal 200*a* is large, that is, when it is estimated that the radio terminal 200*a* is remote from the macro cell base station 300*a*, since a cell (a femto cell) formed by the femto cell base station 100*a* is small, it is possible to estimate that the femto cell base station 100*a* is also remote from the macro cell base station 300*a*.

When the femto cell base station 100*a* is remote from the macro cell base station 300*a*, a radio terminal (for example, a radio terminal around the cell edge of the macro cell base station 300*a*) connected to the macro cell base station 300*a* in the vicinity of the femto cell base station 100*a* is affected by the interference from the femto cell base station 100*a* under the bad radio communication environment, it is highly probable that radio communication with the macro cell base station 300*a* is not possible.

Thus, when the propagation loss (the macro cell-side propagation loss) between the radio terminal 200*a* and the macro cell base station 300*a* is large, the band limitation unit 127 limits a downlink frequency band to be allocated to the radio terminal 200*a*. Specifically, it is possible to employ a method for setting an upper limit in the number of resource blocks to be allocated as the PDSCH, or a method for prohibiting the allocation of a part of resource blocks 1 to 50 to be allocated as the PDSCH.

In this way, it is possible to reduce the probability that a frequency band used by the femto cell base station 100*a* overlaps a frequency band used by the radio terminal connected to the macro cell base station 300*a* in the downlink, resulting in the suppression of interference to the radio terminal, which is connected to the macro cell base station 300*a*, from the femto cell base station 100*a*.

In addition, since a PDCCH section of each resource block includes various pieces of control data for controlling the transmission of user data, it is not preferable to limit the allocation of the PDCCH section.

(4.3) Operation of Radio Communication System

Next, the operation of the radio communication system 1 according to the fourth embodiment will be described.

(4.3.1) Example of Operation Sequence

Figure 14:
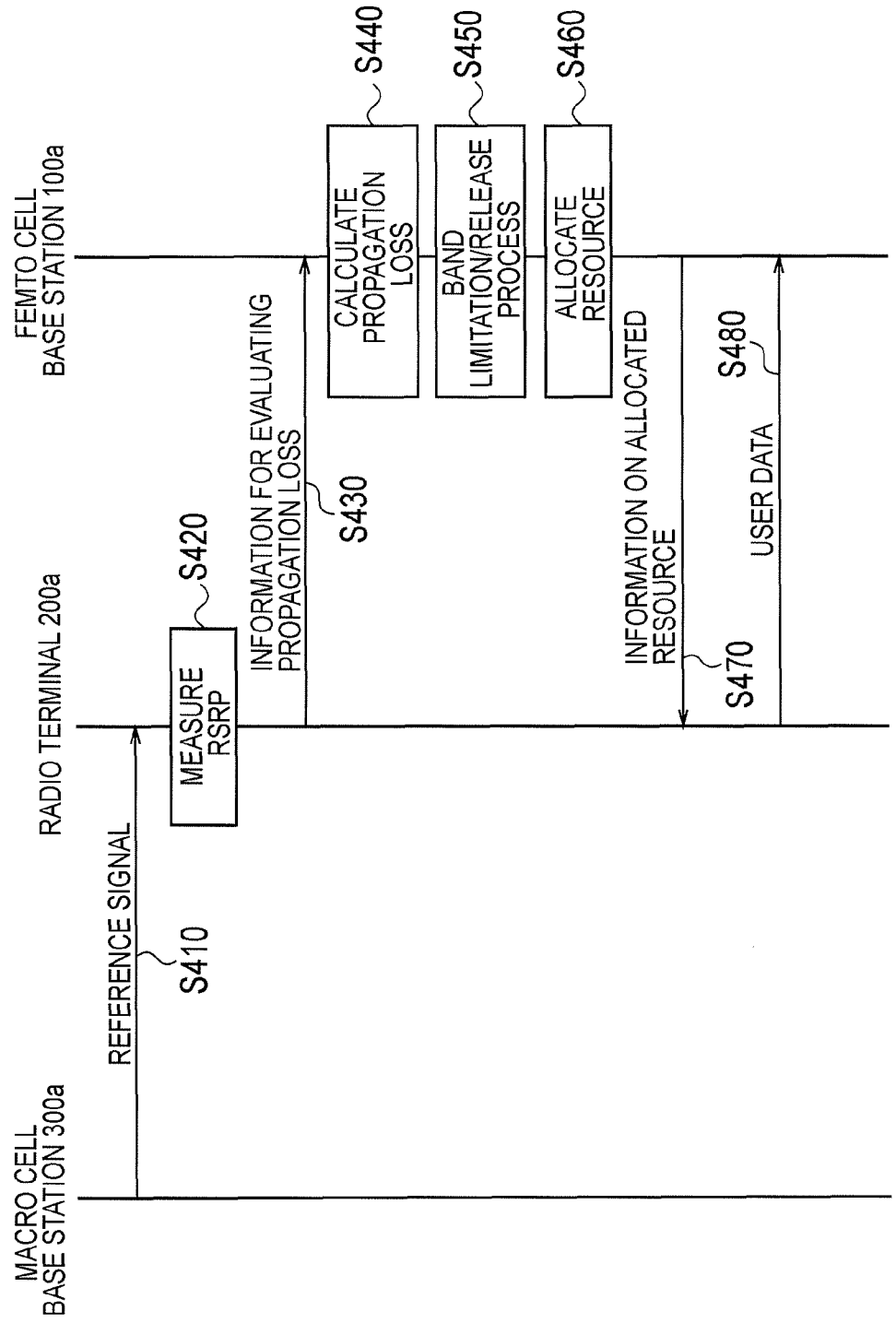
FIG. 14 is a sequence diagram illustrating an operation example of a radio communication system according to the fourth embodiment of the present invention.

FIG. 14 is a sequence diagram illustrating an operation example of the radio communication system 1 according to the fourth embodiment.

In step S410, the macro cell base station 300*a* transmits a reference signal. In addition, the macro cell base station 300*a* periodically transmits the reference signal. The radio terminal 200*a* receives the reference signal.

In step S420, the radio terminal 200*a* measures RSRP based on the reference signal received from the macro cell base station 300*a*.

Here, the radio terminal 200*a* may measure the RSRP with respect to all the macro cell base stations 300 that transmit reference signals receivable in the radio terminal 200*a*. Otherwise, the femto cell base station 100*a* may specify the macro cell base station 300 for which macro cell-side propagation loss is to be measured, and the radio terminal 200*a* may measure the RSRP with respect to the specified macro cell base station 300.

In step S430, the radio terminal 200*a* transmits information on the measured RSRP to the femto cell base station 100*a*. The transceiver unit 110 of the femto cell base station 100*a* receives the information on the RSRP.

In step S440, the propagation loss calculation unit 126 of the femto cell base station 100*a* calculates macro cell-side propagation loss based on the information on the RSRP. Specifically, downlink macro cell-side propagation loss is calculated by subtracting the RSRP from the existing transmission power of a reference signal, and uplink macro cell-side propagation loss is calculated from the calculated downlink macro cell-side propagation loss by using the existing calculation technique as described above.

In step S450, the band limitation unit 127 of the femto cell base station 100*a* performs limitation of uplink and downlink frequency bands or release of the limitation based on the macro cell-side propagation loss.

In step S460, the resource allocation unit 128 of the femto cell base station 100*a* allocates uplink and downlink radio resources to the radio terminal 200*a*. Specifically, the resource allocation unit 128 allocates a resource block to be used as PUSCH and a resource block to be used as PDSCH to the radio terminal 200*a*.

In step S470, the transceiver unit 110 of the femto cell base station 100*a* transmits PDCCH to the radio terminal 200*a*, wherein the PDCCH includes information (control data) indicating the radio resource allocated by the resource allocation unit 128. The radio terminal 200*a* receives the control data.

In step S480, the radio terminal 200*a* transmits an allocated PUSCH including user data to the femto cell base station 100*a*.

(4.3.2) Band Limitation/Release Flow

Next, step S450 of FIG. 14 will be specifically described.

(4.3.2.1) Uplink Band Limitation/Release Flow

Figure 15:
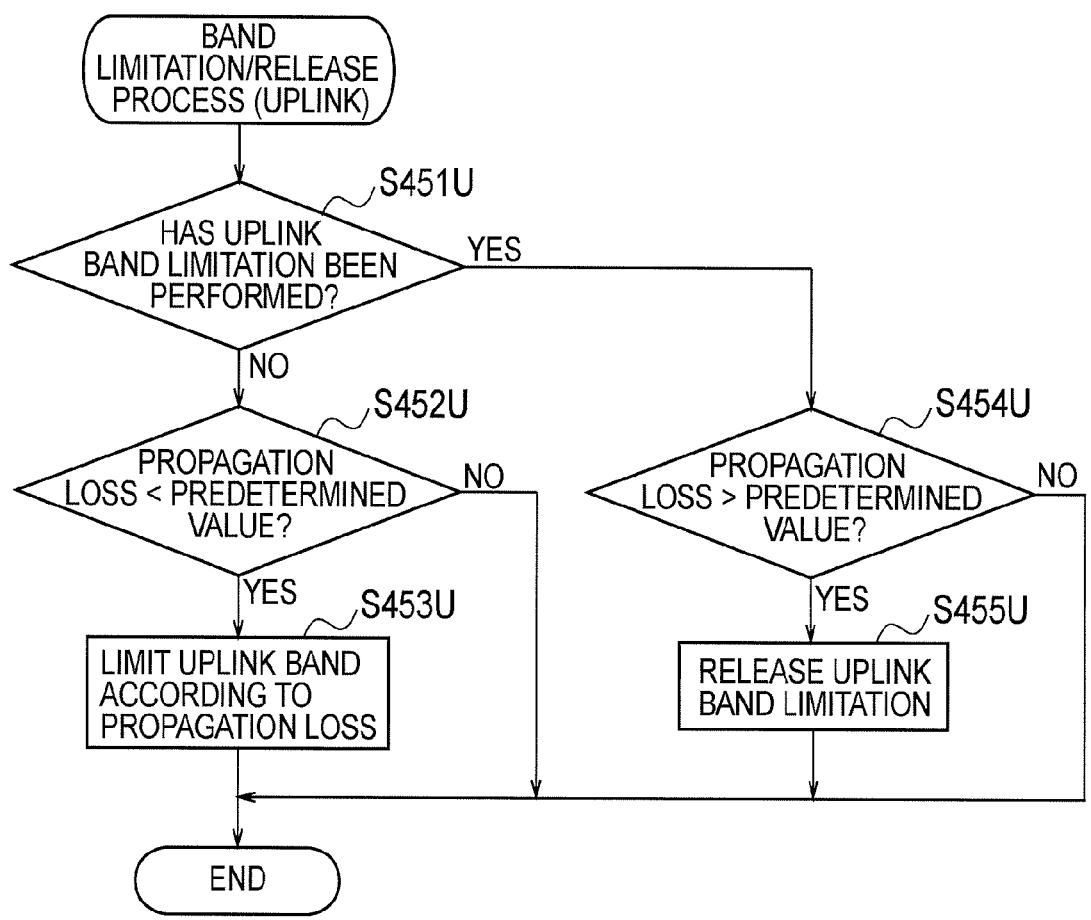
FIG. 15 is a flowchart illustrating an uplink band limitation/release flow according to the fourth embodiment of the present invention.

FIG. 15 is a flowchart illustrating an uplink band limitation/release flow.

When uplink band limitation has not been performed (step S451U; NO), the band limitation unit 127 compares uplink macro cell-side propagation loss with a predetermined value in step S452U.

When the uplink macro cell-side propagation loss is smaller than the predetermined value (step S452U; YES), the band limitation unit 127 limits an uplink frequency band to be allocated to the radio terminal 200*a* according to the uplink macro cell-side propagation loss.

Here, as the uplink macro cell-side propagation loss is small, the band limitation unit 127 strongly limits the uplink frequency band. For example, as the uplink macro cell-side propagation loss is small, it may be possible to reduce the upper limit of the number of resource blocks to be allocated as PUSCH. Otherwise, as the uplink macro cell-side propagation loss is small, it may be possible to increase the number of resource blocks, the allocation of which is prohibited.

Meanwhile, when the uplink band limitation has been already performed (step S451U; YES), the band limitation unit 127 compares the uplink macro cell-side propagation loss with a predetermined value in step S454U.

When the uplink macro cell-side propagation loss is larger than the predetermined value (step S454U; YES), the band limitation unit 127 releases the uplink band limitation.

(4.3.2.2) Downlink Band Limitation/Release Flow

Figure 16:
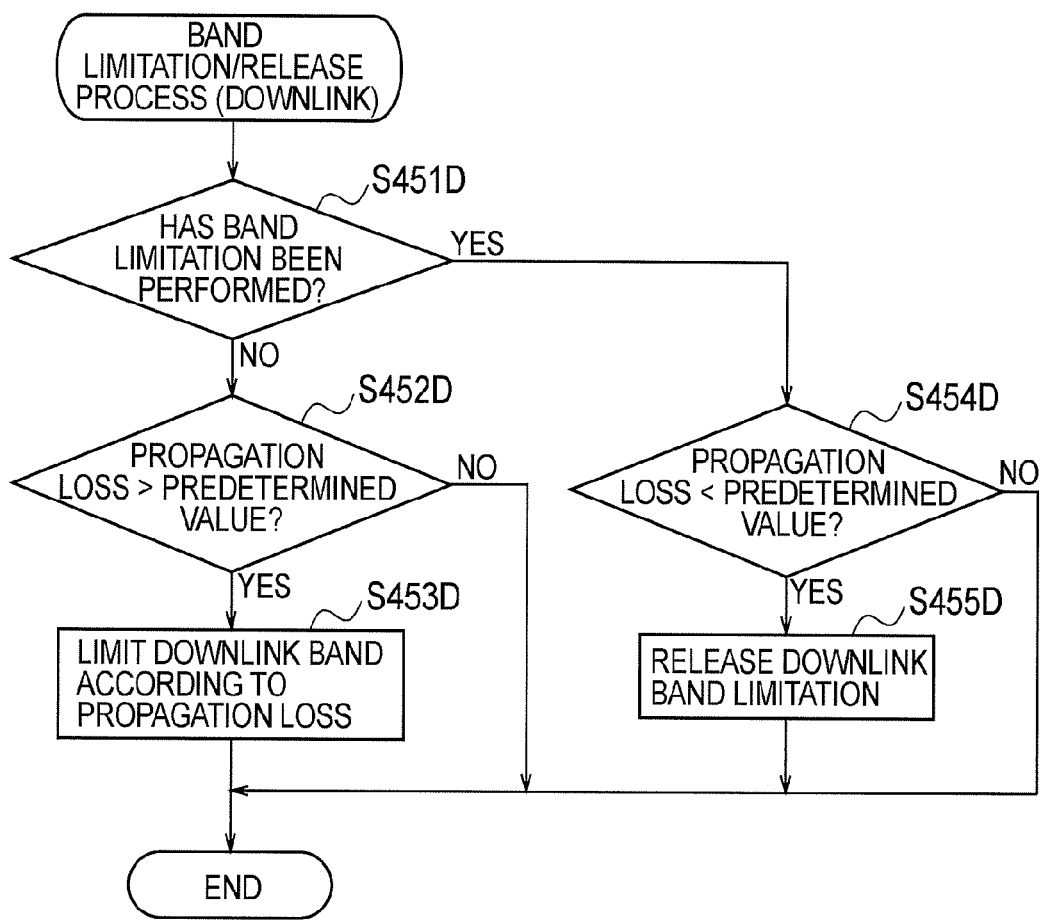
FIG. 16 is a flowchart illustrating a downlink band limitation/release flow according to the fourth embodiment of the present invention.

FIG. 16 is a flowchart illustrating a downlink band limitation/release flow.

When downlink band limitation has not been performed (step S451D; NO), the band limitation unit 127 compares downlink macro cell-side propagation loss with a predetermined value in step S452D.

When the downlink macro cell-side propagation loss is larger than the predetermined value (step S452D; YES), the band limitation unit 127 limits a downlink frequency band to be allocated to the radio terminal 200*a* according to the downlink macro cell-side propagation loss.

Here, as the downlink macro cell-side propagation loss is large, the band limitation unit 127 strongly limits the downlink frequency band. For example, as the downlink macro cell-side propagation loss is large, it may be possible to reduce the upper limit of the number of resource blocks to be allocated as PDSCH. Otherwise, as the downlink macro cell-side propagation loss is large, it may be possible to increase the number of resource blocks, the allocation of which is prohibited.

Meanwhile, when the downlink band limitation has been already performed (step S451D; YES), the band limitation unit 127 compares the downlink macro cell-side propagation loss with a predetermined value in step S454D.

When the downlink macro cell-side propagation loss is smaller than the predetermined value (step S454D; YES), the band limitation unit 127 releases the downlink band limitation.

In addition, in the operation flow illustrated in FIG. 16, the downlink macro cell-side propagation loss is used. However, since it is sufficient if it is possible to estimate a distance as described above, the uplink macro cell-side propagation loss may be used instead of the downlink macro cell-side propagation loss.

(4.4) Effect of Fourth Embodiment

As described above, according to the fourth embodiment, the uplink and downlink frequency bands to be allocated to the radio terminal 200*a* are limited based on the macro cell-side propagation loss, so that it is possible to suppress interference to the macro cell base station 300*a* from the radio terminal 200*a*, and interference to the radio terminal 200*c* from the femto cell base station 100*a*.

In addition, the femto cell base station 100*a* performs frequency band limitation with respect to one radio terminal 200*a*. However, when a plurality of radio terminals 200*a* are connected to the femto cell base station 100*a*, the band limitation may be individually applied to each of the plurality of radio terminals 200*a*. Otherwise, the band limitation may be uniformly applied to all the plurality of radio terminals 200*a* based on an average of macro cell-side propagation loss of the plurality of radio terminals 200*a*.

(5) Other Embodiments

As described above, the present invention has been described with the embodiments. However, it should not be understood that those descriptions and drawings constituting a part of the present disclosure limit the present invention. From the present disclosure, various alternative embodiments, embodiments, and operational technologies will become apparent to those skilled in the art.

In the above-mentioned first to third embodiments, the transmission power adjustment value is calculated by the function $P_{offset}(x)$ for adjustment. However, the present invention is not limited to the method using the formula. For example, a table, in which the transmission power adjustment value is associated with each predetermined range of x, may be stored, and may be used as conversion information.

In the above-mentioned second transmission power control method, $x=PL_1-PL_0$ may be weighted, for example, x may be calculated by $x=a*PL_1-(1-a)*PL_0$ (0<a<1). In the same manner, in the fourth transmission power control method, $x=PL_{ave}-PL_0$ may be weighted, for example, x may be calculated by $x=b*PL_{ave}-(1-b)*PL_0$ (0<b<1).

In the above-mentioned first to fourth embodiments, the femto cell base station has been described as a small cell base station. However, it is sufficient if the small cell base station is a base station (for example, a pico cell base station) similar to the femto cell base station. In this case, an X2 interface may be provided between the macro cell base station and the pico cell base station.

In addition, in the above-mentioned each embodiment, the transmission power of the reference signal is a known value. However, when each base station transmits information on the transmission power of a reference signal through broadcast, it is possible to recognize the transmission power of the reference signal transmitted through the broadcast.

Thus, it must be understood that the present invention includes various embodiments that are not described herein. Therefore, the present invention is limited only by the specific features of the invention in the scope of the claims reasonably evident from the disclosure above.

Note that the entire contents of Japanese Patent Application No. 2009-186914 (filed on Aug. 11, 2009) are incorporated in the present specification by reference.

INDUSTRIAL APPLICABILITY

As described above, in accordance with the radio communication system, the small cell base station, the radio terminal, the transmission power control method, and the allocation control method according to the present invention, it is possible to reduce interference to a large cell base station from the radio terminal connected to the small cell base station, so that the present invention is available for radio communication such as mobile communication.

The invention claimed is:

1. A small cell base station that forms a small cell smaller than a large cell formed by a large cell base station and that is installable in the large cell, comprising:
a transmission power control unit configured to control transmission power of a radio signal transmitted from a radio terminal connected to the small cell base station to the small cell base station, based on large cell-side propagation loss indicating propagation loss between the radio terminal and the radio terminal's neighboring large cell base stations, wherein
the transmission power control unit controls the transmission power, based on small cell-side propagation loss indicating propagation loss between the radio terminal and the small cell base station connected to the radio terminal, in addition to the large cell-side propagation loss, and comprises:

a reference value setting unit configured to set a transmission power reference value, which serves as a reference of the transmission power, by using the small cell-side propagation loss;

an adjustment value setting unit configured to set a transmission power adjustment value for adjusting the transmission power by using the large cell-side propagation loss; and a transmission power determination unit configured to determine the transmission power by using the transmission power reference value and the transmission power adjustment value, wherein the adjustment value setting unit sets the transmission power adjustment value such that the transmission power is reduced as the large cell-side propagation loss is small, and the transmission power is increased as the large cell-side propagation loss is large.

2. A radio terminal connected to a small cell base station that forms a small cell smaller than a large cell formed by a large cell base station and that is installable in the large cell, comprising:

a transmission power control unit configured to control transmission power of a radio signal transmitted from the radio terminal to the small cell base station, based on large cell-side propagation loss indicating propagation loss between the radio terminal and the radio terminal's neighboring large cell base stations, wherein the transmission power control unit controls the transmission power, based on small cell-side propagation loss indicating propagation loss between the radio terminal and the small cell base station connected to the radio terminal, in addition to the large cell-side propagation loss, and comprises:

a reference value setting unit configured to set a transmission power reference value, which serves as a reference of the transmission power, by using the small cell-side propagation loss;

an adjustment value setting unit configured to set a transmission power adjustment value for adjusting the transmission power by using the large cell-side propagation loss; and a transmission power determination unit configured to determine the transmission power by using the transmission power reference value and the transmission power adjustment value, wherein the adjustment value setting unit sets the transmission power adjustment value such that the transmission power is reduced as the large cell-side propagation loss is small, and the transmission power is increased as the large cell-side propagation loss is large.

3. A small cell base station that forms a small cell smaller than a large cell formed by a large cell base station and that is installable in the large cell, comprising:

a band limitation unit configured to limit a frequency band to be allocated to a radio terminal connected to the small cell base station, based on large cell-side propagation loss indicating propagation loss between the radio terminal and the radio terminal's neighboring the large cell base stations, wherein the band limitation unit:

limits an uplink frequency band to be allocated to the radio terminal when the large cell-side propagation loss becomes lower than a predetermined value, and releases limitation of the uplink frequency band when the large cell-side propagation loss exceeds the predetermined value, and limits a downlink frequency band to be allocated to the radio terminal when the large cell-side propagation loss exceeds a predetermined value, and releases limitation of the downlink frequency band to be allocated to the radio terminal when the large cell-side propagation loss becomes lower than the predetermined value.

4. The small cell base station according to claim 3, wherein the large cell-side propagation loss is propagation loss between the radio terminal and a large cell base station among the neighboring large cell base stations, which has smallest propagation loss with the radio terminal.

5. The small cell base station according to claim 3, wherein the large cell-side propagation loss is an average of propagation loss between the radio terminal and each of the neighboring large cell base stations.

6. The small cell base station according to claim 3, wherein the large cell-side propagation loss is an average of propagation loss between the neighboring large cell base stations and the radio terminal, and propagation loss between the radio terminal and a small cell base station, other than the small cell base station connected to the radio terminal, among the radio terminal's neighboring small cell base stations.

7. A small cell base station that forms a small cell smaller than a large cell formed by a large cell base station and that is installable in the large cell, comprising:

a transmission power control unit configured to control transmission power of a radio signal transmitted from a radio terminal connected to the small cell base station to the small cell base station, based on large cell-side propagation loss indicating propagation loss between the radio terminal and the radio terminal's neighboring large cell base stations, wherein the transmission power control unit controls the transmission power, based on small cell-side propagation loss indicating propagation loss between the radio terminal and the small cell base station connected to the radio terminal, in addition to the large cell-side propagation loss, and comprises:

a reference value setting unit configured to set a transmission power reference value, which serves as a reference of the transmission power, by using the small cell-side propagation loss;

an adjustment value setting unit configured to set a transmission power adjustment value for adjusting the transmission power by using the large cell-side propagation loss and the small cell-side propagation loss; and a transmission power determination unit configured to determine the transmission power by using the transmission power reference value and the transmission power adjustment value, wherein the adjustment value setting unit:

calculates a result obtained by subtracting the small cell-side propagation loss from the large cell-side propagation loss, as propagation loss difference, sets the transmission power adjustment value such that the transmission power is reduced when the propagation loss difference has a negative value or a positive small value, and sets the transmission power adjustment value such that the transmission power is increased when the propagation loss difference has a positive large value.

8. A radio terminal connected to a small cell base station that forms a small cell smaller than a large cell formed by a large cell base station and that is installable in the large cell, comprising:

a transmission power control unit configured to control transmission power of a radio signal transmitted from the radio terminal to the small cell base station, based on large cell-side propagation loss indicating propagation loss between the radio terminal and the radio terminal's neighboring large cell base stations, wherein the transmission power control unit controls the transmission power, based on small cell-side propagation loss indicating propagation loss between the radio terminal and the small cell base station connected to the radio terminal, in addition to the large cell-side propagation loss, and comprises:

a reference value setting unit configured to set a transmission power reference value, which serves as a reference of the transmission power, by using the small cell-side propagation loss;

an adjustment value setting unit configured to set a transmission power adjustment value for adjusting the transmission power by using the large cell-side propagation loss and the small cell-side propagation loss; and a transmission power determination unit configured to determine the transmission power by using the transmission power reference value and the transmission power adjustment value, wherein the adjustment value setting unit:

calculates a result obtained by subtracting the small cell-side propagation loss from the large cell-side propagation loss, as propagation loss difference, sets the transmission power adjustment value such that the transmission power is reduced when the propagation loss difference has a negative value or a positive small value, and sets the transmission power adjustment value such that the transmission power is increased when the propagation loss difference has a positive large value.

* * * * *